(12) United States Patent
Scott et al.

(10) Patent No.: US 10,909,130 B1
(45) Date of Patent: Feb. 2, 2021

(54) GRAPHICAL USER INTERFACE FOR A DATABASE SYSTEM

(71) Applicant: Palantir Technologies Inc., Palo Alto, CA (US)

(72) Inventors: Shannon Scott, New York, NY (US);
Walker Burgin, Seattle, WA (US);
Hem Wadhar, San Francisco, CA (US);
Grace Wang, New York, NY (US);
Christopher Li, New York, NY (US);
Michael Tuer, Palo Alto, CA (US);
Dipanjan Sen, New York, NY (US);
Stephen Klapper, Teaneck, NJ (US)

(73) Assignee: Palantir Technologies Inc., Denver, CO (US)

( * ) Notice: Subject to any disclaimer, the term of this patent is extended or adjusted under 35 U.S.C. 154(b) by 230 days.

(21) Appl. No.: 15/201,213

(22) Filed: Jul. 1, 2016

(51) Int. Cl.
*G06F 16/248* (2019.01)
*G06F 3/0484* (2013.01)
*G06F 16/2455* (2019.01)
*G06F 3/0481* (2013.01)
*G06F 16/242* (2019.01)
*G06F 16/2458* (2019.01)

(52) U.S. Cl.
CPC .......... *G06F 16/248* (2019.01); *G06F 3/0481* (2013.01); *G06F 3/04842* (2013.01); *G06F 16/244* (2019.01); *G06F 16/2455* (2019.01); *G06F 16/2462* (2019.01)

(58) Field of Classification Search
CPC ......... G06F 17/30554; G06F 17/30412; G06F 17/30477; G06F 17/30536; G06F 16/248; G06F 16/244; G06F 16/2455; G06F 16/2462; G06F 3/04842; G06F 3/0481
See application file for complete search history.

(56) References Cited

U.S. PATENT DOCUMENTS

| | | | |
|---|---|---|---|
| 6,101,479 | A | 8/2000 | Shaw |
| 6,430,305 | B1 | 8/2002 | Decker |
| 6,820,135 | B1 | 11/2004 | Dingman |

(Continued)

FOREIGN PATENT DOCUMENTS

| | | |
|---|---|---|
| CN | 102546446 | 7/2012 |
| CN | 103167093 | 6/2013 |

(Continued)

OTHER PUBLICATIONS

"HunchLab: Heat Map and Kernel Density Calculation for Crime Analysis," Azavea Journal, printed from www.azavea.com/blogs/newsletter/v4i4/kernel-density-capabilities-added-to-hunchlab/ on Sep. 9, 2014, 2 pages.

(Continued)

*Primary Examiner* — Kannan Shanmugasundaram
(74) *Attorney, Agent, or Firm* — Knobbe, Martens, Olson & Bear, LLP

(57) ABSTRACT

The system includes interactive user interfaces that allow a user to select attributes, entities, and statistical measures to query the combined data sets. The system allows users to visually construct queries of the database. The system may automatically generate multiple queries and/or query the database multiple times in response to user interface selections. The query parameters and results can be stored and shared with other users.

13 Claims, 27 Drawing Sheets

(56) References Cited

U.S. PATENT DOCUMENTS

| | | |
|---|---|---|
| 6,978,419 B1 | 12/2005 | Kantrowitz |
| 6,980,984 B1 | 12/2005 | Huffman et al. |
| 7,168,039 B2 | 1/2007 | Bertram |
| 7,617,232 B2 | 11/2009 | Gabbert et al. |
| 7,756,843 B1 | 7/2010 | Palmer |
| 7,800,796 B2 | 9/2010 | Saito |
| 7,899,796 B1 | 3/2011 | Borthwick et al. |
| 7,917,376 B2 | 3/2011 | Bellin et al. |
| 7,941,321 B2 | 5/2011 | Greenstein et al. |
| 8,036,971 B2 | 10/2011 | Aymeloglu et al. |
| 8,046,283 B2 | 10/2011 | Burns |
| 8,054,756 B2 | 11/2011 | Chand et al. |
| 8,214,490 B1 | 7/2012 | Vos et al. |
| 8,229,902 B2 | 7/2012 | Vishniac et al. |
| 8,290,838 B1 | 10/2012 | Thakur et al. |
| 8,302,855 B2 | 11/2012 | Ma et al. |
| 8,392,556 B2 | 3/2013 | Goulet et al. |
| 8,473,454 B2 | 6/2013 | Evanitsky et al. |
| 8,484,115 B2 | 7/2013 | Aymeloglu et al. |
| 8,589,273 B2 | 11/2013 | Creeden et al. |
| 8,688,573 B1 | 4/2014 | Ruknoic et al. |
| 8,744,890 B1 | 6/2014 | Bernier |
| 8,812,960 B1 | 8/2014 | Sun et al. |
| 8,924,388 B2 | 12/2014 | Elliot et al. |
| 8,924,389 B2 | 12/2014 | Elliot et al. |
| 8,938,686 B1 | 1/2015 | Erenrich et al. |
| 8,949,164 B1 | 2/2015 | Mohler |
| 9,100,428 B1 | 8/2015 | Visbal |
| 9,129,219 B1 | 9/2015 | Robertson et al. |
| 2002/0065708 A1 | 5/2002 | Senay et al. |
| 2002/0095360 A1 | 7/2002 | Joao |
| 2002/0095658 A1 | 7/2002 | Shulman |
| 2002/0103705 A1 | 8/2002 | Brady |
| 2002/0147805 A1 | 10/2002 | Leshem et al. |
| 2003/0036848 A1 | 2/2003 | Sheha et al. |
| 2003/0061132 A1 | 3/2003 | Mason et al. |
| 2003/0126102 A1 | 7/2003 | Borthwick |
| 2003/0172014 A1 | 9/2003 | Quackenbush et al. |
| 2004/0034570 A1 | 2/2004 | Davis |
| 2004/0111480 A1 | 6/2004 | Yue |
| 2004/0153418 A1 | 8/2004 | Hanweck |
| 2004/0236688 A1 | 11/2004 | Bozeman |
| 2005/0010472 A1 | 1/2005 | Quatse et al. |
| 2005/0086207 A1 | 4/2005 | Heuer et al. |
| 2005/0154628 A1 | 7/2005 | Eckart et al. |
| 2005/0154769 A1 | 7/2005 | Eckart et al. |
| 2005/0289100 A1* | 12/2005 | Dettinger ............ G06F 16/2425 707/999.001 |
| 2006/0026120 A1 | 2/2006 | Carolan et al. |
| 2006/0143034 A1 | 6/2006 | Rothermel |
| 2006/0143075 A1 | 6/2006 | Carr et al. |
| 2006/0143079 A1 | 6/2006 | Basak et al. |
| 2006/0200480 A1* | 9/2006 | Harris ............... G06F 17/30876 |
| 2007/0000999 A1 | 1/2007 | Kubo et al. |
| 2007/0011304 A1 | 1/2007 | Error |
| 2007/0038646 A1 | 2/2007 | Thota |
| 2007/0150801 A1 | 6/2007 | Chidlovskii et al. |
| 2007/0156673 A1 | 7/2007 | Maga |
| 2007/0185867 A1 | 8/2007 | Maga |
| 2007/0284433 A1 | 12/2007 | Domenica et al. |
| 2008/0040275 A1 | 2/2008 | Paulsen et al. |
| 2008/0069081 A1 | 3/2008 | Chand et al. |
| 2008/0103996 A1 | 5/2008 | Forman et al. |
| 2008/0222295 A1 | 9/2008 | Robinson et al. |
| 2008/0243711 A1 | 10/2008 | Aymeloglu et al. |
| 2008/0249983 A1 | 10/2008 | Meisels et al. |
| 2008/0255973 A1 | 10/2008 | El Wade et al. |
| 2008/0306911 A1* | 12/2008 | Loofbourrow ...... G06F 16/2272 707/999.003 |
| 2008/0313132 A1 | 12/2008 | Hao et al. |
| 2009/0076845 A1 | 3/2009 | Bellin et al. |
| 2009/0094166 A1 | 4/2009 | Aymeloglu et al. |
| 2009/0106178 A1 | 4/2009 | Chu |
| 2009/0112745 A1 | 4/2009 | Stefanescu |
| 2009/0125359 A1 | 5/2009 | Knapic |
| 2009/0125459 A1 | 5/2009 | Norton et al. |
| 2009/0187546 A1 | 7/2009 | Whyte et al. |
| 2009/0187548 A1 | 7/2009 | Ji et al. |
| 2009/0249244 A1 | 10/2009 | Robinson et al. |
| 2009/0271343 A1 | 10/2009 | Vaiciulis et al. |
| 2009/0307049 A1 | 12/2009 | Elliott et al. |
| 2009/0313463 A1 | 12/2009 | Pang et al. |
| 2009/0319418 A1 | 12/2009 | Herz |
| 2009/0319891 A1 | 12/2009 | MacKinlay |
| 2010/0005089 A1* | 1/2010 | Yacobi .................. G06Q 10/04 707/E17.014 |
| 2010/0030722 A1 | 2/2010 | Goodson et al. |
| 2010/0031141 A1 | 2/2010 | Summers et al. |
| 2010/0042922 A1 | 2/2010 | Bradateanu et al. |
| 2010/0057622 A1 | 3/2010 | Faith et al. |
| 2010/0070842 A1 | 3/2010 | Aymeloglu et al. |
| 2010/0076813 A1 | 3/2010 | Ghosh et al. |
| 2010/0098318 A1 | 4/2010 | Anderson |
| 2010/0114887 A1 | 5/2010 | Conway et al. |
| 2010/0131502 A1 | 5/2010 | Fordham |
| 2010/0161735 A1 | 6/2010 | Sharma |
| 2010/0191563 A1 | 7/2010 | Schlaifer et al. |
| 2010/0235915 A1 | 9/2010 | Memon et al. |
| 2010/0262688 A1 | 10/2010 | Hussain et al. |
| 2010/0312837 A1 | 12/2010 | Bodapati et al. |
| 2011/0004498 A1 | 1/2011 | Readshaw |
| 2011/0061013 A1 | 3/2011 | Bilicki et al. |
| 2011/0078173 A1 | 3/2011 | Seligmann et al. |
| 2011/0093327 A1 | 4/2011 | Fordyce et al. |
| 2011/0099133 A1 | 4/2011 | Chang et al. |
| 2011/0153384 A1 | 6/2011 | Horne et al. |
| 2011/0161137 A1 | 6/2011 | Ubalde et al. |
| 2011/0173093 A1 | 7/2011 | Psota et al. |
| 2011/0208565 A1 | 8/2011 | Ross et al. |
| 2011/0213655 A1 | 9/2011 | Henkin |
| 2011/0218955 A1 | 9/2011 | Tang |
| 2011/0270604 A1 | 11/2011 | Qi et al. |
| 2011/0270834 A1 | 11/2011 | Sokolan et al. |
| 2011/0289397 A1 | 11/2011 | Eastmond et al. |
| 2011/0295649 A1 | 12/2011 | Fine |
| 2011/0314007 A1 | 12/2011 | Dassa et al. |
| 2011/0314024 A1 | 12/2011 | Chang et al. |
| 2012/0011238 A1 | 1/2012 | Rathod |
| 2012/0011245 A1 | 1/2012 | Gillette et al. |
| 2012/0022945 A1 | 1/2012 | Falkenborg et al. |
| 2012/0054284 A1 | 3/2012 | Rakshit |
| 2012/0059853 A1 | 3/2012 | Jagota |
| 2012/0066166 A1 | 3/2012 | Curbera et al. |
| 2012/0079363 A1 | 3/2012 | Folting et al. |
| 2012/0084117 A1 | 4/2012 | Tavares et al. |
| 2012/0084287 A1 | 4/2012 | Lakshminarayan et al. |
| 2012/0116828 A1 | 5/2012 | Shannon |
| 2012/0131512 A1 | 5/2012 | Takeuchi et al. |
| 2012/0159362 A1 | 6/2012 | Brown et al. |
| 2012/0173381 A1 | 7/2012 | Smith |
| 2012/0215784 A1 | 8/2012 | King et al. |
| 2012/0221553 A1 | 8/2012 | Wittmer et al. |
| 2012/0226523 A1 | 9/2012 | Weiss |
| 2012/0245976 A1 | 9/2012 | Kumar et al. |
| 2012/0323888 A1 | 12/2012 | Osann, Jr. |
| 2013/0016106 A1 | 1/2013 | Yip et al. |
| 2013/0054306 A1 | 2/2013 | Bhalla |
| 2013/0057551 A1 | 3/2013 | Ebert et al. |
| 2013/0096988 A1 | 4/2013 | Grossman et al. |
| 2013/0110746 A1 | 5/2013 | Ahn |
| 2013/0151453 A1 | 6/2013 | Bhanot et al. |
| 2013/0166348 A1 | 6/2013 | Scotto |
| 2013/0166480 A1 | 6/2013 | Popescu et al. |
| 2013/0185245 A1 | 7/2013 | Anderson |
| 2013/0185307 A1 | 7/2013 | El-Yaniv et al. |
| 2013/0226318 A1 | 8/2013 | Procyk |
| 2013/0238616 A1 | 9/2013 | Rose et al. |
| 2013/0246170 A1 | 9/2013 | Gross et al. |
| 2013/0246537 A1 | 9/2013 | Gaddala |
| 2013/0246597 A1 | 9/2013 | Iizawa et al. |
| 2013/0263019 A1 | 10/2013 | Castellanos et al. |
| 2013/0282696 A1 | 10/2013 | John et al. |
| 2013/0290825 A1 | 10/2013 | Arndt et al. |
| 2013/0297619 A1 | 11/2013 | Chandrasekaran et al. |

(56) References Cited

U.S. PATENT DOCUMENTS

| | | |
|---|---|---|
| 2013/0304770 A1 | 11/2013 | Boero et al. |
| 2014/0012796 A1 | 1/2014 | Petersen et al. |
| 2014/0040371 A1 | 2/2014 | Gurevich et al. |
| 2014/0058914 A1 | 2/2014 | Song et al. |
| 2014/0068487 A1 | 3/2014 | Steiger et al. |
| 2014/0089339 A1 | 3/2014 | Siddiqui et al. |
| 2014/0095509 A1 | 4/2014 | Patton |
| 2014/0108380 A1 | 4/2014 | Gotz et al. |
| 2014/0108985 A1 | 4/2014 | Scott et al. |
| 2014/0123279 A1 | 5/2014 | Bishop et al. |
| 2014/0136285 A1 | 5/2014 | Carvalho |
| 2014/0143009 A1 | 5/2014 | Brice et al. |
| 2014/0156527 A1 | 6/2014 | Grigg et al. |
| 2014/0157172 A1 | 6/2014 | Peery et al. |
| 2014/0164071 A1* | 6/2014 | English ............ G06Q 10/06375 705/7.37 |
| 2014/0164502 A1 | 6/2014 | Khodorenko et al. |
| 2014/0189536 A1 | 7/2014 | Lange et al. |
| 2014/0195515 A1 | 7/2014 | Baker et al. |
| 2014/0222521 A1 | 8/2014 | Chait |
| 2014/0222793 A1 | 8/2014 | Sadkin et al. |
| 2014/0229554 A1 | 8/2014 | Grunin et al. |
| 2014/0258246 A1 | 9/2014 | Lo Faro et al. |
| 2014/0344230 A1 | 11/2014 | Krause et al. |
| 2014/0351070 A1 | 11/2014 | Christner et al. |
| 2014/0358829 A1 | 12/2014 | Hurwitz |
| 2014/0366132 A1 | 12/2014 | Stiansen et al. |
| 2015/0073929 A1 | 3/2015 | Psota et al. |
| 2015/0073954 A1 | 3/2015 | Braff |
| 2015/0095773 A1 | 4/2015 | Gonsalves et al. |
| 2015/0100897 A1 | 4/2015 | Sun et al. |
| 2015/0100907 A1 | 4/2015 | Erenrich et al. |
| 2015/0106379 A1 | 4/2015 | Elliot et al. |
| 2015/0134694 A1* | 5/2015 | Burke .................. G06Q 10/00 707/769 |
| 2015/0135256 A1 | 5/2015 | Hoy et al. |
| 2015/0188872 A1 | 7/2015 | White |
| 2015/0338233 A1 | 11/2015 | Cervelli et al. |
| 2015/0379413 A1 | 12/2015 | Robertson et al. |
| 2016/0004764 A1 | 1/2016 | Chakerian et al. |
| 2016/0026923 A1 | 1/2016 | Erenrich et al. |
| 2016/0055501 A1 | 2/2016 | Mukherjee et al. |

FOREIGN PATENT DOCUMENTS

| | | |
|---|---|---|
| CN | 102054015 | 5/2014 |
| DE | 102014204827 | 9/2014 |
| DE | 102014204830 | 9/2014 |
| DE | 102014204834 | 9/2014 |
| EP | 2487610 | 8/2012 |
| EP | 2858018 | 4/2015 |
| EP | 2869211 | 5/2015 |
| EP | 2889814 | 7/2015 |
| EP | 2892197 | 7/2015 |
| EP | 2963595 | 1/2016 |
| EP | 2988258 | 2/2016 |
| WO | WO 2005/116851 | 12/2005 |

OTHER PUBLICATIONS

"Refresh CSS Ellipsis When Resizing Container—Stack Overflow," Jul. 31, 2013, retrieved from internet http://stackoverflow.com/questions/17964681/refresh-css-ellipsis-when-resizing-container, retrieved on May 18, 2015.

Amnet, "5 Great Tools for Visualizing Your Twitter Followers," posted Aug. 4, 2010, http://www.amnetblog.com/component/content/article/115-5-grate-tools-for-visualizing-your-twitter-followers.html.

Appacts, "Smart Thinking for Super Apps," http://www.appacts.com Printed Jul. 18, 2013 in 4 pages.

Apsalar, "Data Powered Mobile Advertising," "Free Mobile App Analytics" and various analytics related screen shots http://apsalar.com Printed Jul. 18, 2013 in 8 pages.

Capptain—Pilot Your Apps, http://www.capptain.com Printed Jul. 18, 2013 in 6 pages.

Celik, Tantek, "CSS Basic User Interface Module Level 3 (CSS3 UI)," Section 8 Resizing and Overflow, Jan. 17, 2012, retrieved from internet http://www.w3.org/TR/2012/WD-css3-ui-20120117/#resizing-amp-overflow retrieved on May 18, 2015.

Chaudhuri et al., "An Overview of Business Intelligence Technology," Communications of the ACM, Aug. 2011, vol. 54, No. 8.

Cohn, et al., "Semi-supervised clustering with user feedback," Constrained Clustering: Advances in Algorithms, Theory, and Applications 4.1 (2003): 17-32.

Countly Mobile Analytics, http://count.ly/ Printed Jul. 18, 2013 in 9 pages.

DISTIMO—App Analytics, http://www.distimo.com/app-analytics Printed Jul. 18, 2013 in 5 pages.

Ferreira et al., "A Scheme for Analyzing Electronic Payment Systems," Basil 1997.

Flurry Analytics, http://www.flurry.com/ Printed Jul. 18, 2013 in 14 pages.

Google Analytics Official Website—Web Analytics & Reporting, http://www.google.com/analytics.index.html Printed Jul. 18, 2013 in 22 pages.

Gorr et al., "Crime Hot Spot Forecasting: Modeling and Comparative Evaluation", Grant 98-IJ-CX-K005, May 6, 2002, 37 pages.

Gu et al., "Record Linkage: Current Practice and Future Directions," Jan. 15, 2004, pp. 32.

Hansen et al., "Analyzing Social Media Networks with NodeXL: Insights from a Connected World", Chapter 4, pp. 53-67 and Chapter 10, pp. 143-164, published Sep. 2010.

Hua et al., "A Multi-attribute Data Structure with Parallel Bloom Filters for Network Services", HiPC 2006, LNCS 4297, pp. 277-288, 2006.

Keylines.com, "An Introduction to KeyLines and Network Visualization," Mar. 2014, http://keylines.com/wp-content/uploads/2014/03/KeyLines-Whte-Paper.pdf downloaded May 12, 2014 in 8 pages.

Keylines.com, "KeyLines Datasheet," Mar. 2014, http://keylines.com/wp-content/uploads/2014/03/KeyLines-datasheet.pdf downloaded May 12, 2014 in 2 pages.

Keylines.com, "Visualizing Threats: Improved Cyber Security Through Network Visualization," Apr. 2014, http://keylines.com/wp-content/uploads/2014/04/Visualizing-Threats1.pdf downloaded May 12, 2014 in 10 pages.

Kontagent Mobile Analytics, http://www.kontagent.com/ Printed Jul. 18, 2013 in 9 pages.

Localytics—Mobile App Marketing & Analytics, http://www.localytics.com/ Printed Jul. 18, 2013 in 12 pages.

Manno et al., "Introducing Collaboration in Single-user Applications through the Centralized Control Architecture," 2010, pp. 10.

Mixpanel—Mobile Analytics, https://mixpanel.com/ Printed Jul. 18, 2013 in 13 pages.

Open Web Analytics (OWA), http://www.openwebanalytics.com/ Printed Jul. 19, 2013 in 5 pages.

Piwik—Free Web Analytics Software. http://piwik.org/ Printed Jul. 19, 2013 in18 pages.

Sigrist, et al., "PROSITE, a protein domain database for functional characterization and annotation," Nucleic Acids Research 38.suppl 1 (2010): D161-D166.

StatCounter—Free Invisible Web Tracker, Hit Counter and Web Stats, http://statcounter.com/ Printed Jul. 19, 2013 in 17 pages.

TestFlight—Beta Testing on the Fly, http://testflightapp.com/ Printed Jul. 18, 2013 in 3 pages.

trak.io, http://trak.io/ printed Jul. 18, 2013 in 3 pages.

UserMetrix, http://usermetrix.com/android-analytics printed Jul. 18, 2013 in 3 pages.

Valentini et al., "Ensembles of Learning Machines", M. Marinaro and R. Tagliaferri (Eds.): WIRN VIETRI 2002, LNCS 2486, pp. 3-20.

Vose et al., "Help File for ModelRisk Version 5," 2007, Vose Software, pp. 349-353. [Uploaded in 2 Parts].

Wang et al., "Research on a Clustering Data De-Duplication Mechanism Based on Bloom Filter," IEEE 2010, 5 pages.

Wikipedia, "Multimap," Jan. 1, 2013, https://en.wikipedia.org/w/index.php?title=Muitimap&oldid=530800748.

(56) References Cited

OTHER PUBLICATIONS

Notice of Allowance for U.S. Appl. No. 14/225,084 dated May 4, 2015.
Notice of Allowance for U.S. Appl. No. 14/319,161 dated May 4, 2015.
Notice of Allowance for U.S. Appl. No. 14/323,935 dated Oct. 1, 2015.
Notice of Allowance for U.S. Appl. No. 14/479,863 dated Mar. 31, 2015.
Notice of Allowance for U.S. Appl. No. 14/552,336 dated Nov. 3, 2015.
Notice of Allowance for U.S. Appl. No. 14/746,671 dated Jan. 21, 2016.
Official Communication for European Patent Application No. 14187996.5 dated Feb. 12, 2015.
Official Communication for European Patent Application No. 14191540.5 dated May 27, 2015.
Official Communication for European Patent Application No. 14200246.8 dated May 29, 2015.
Official Communication for European Patent Application No. 14200298.9 dated May 13, 2015.
Official Communication for European Patent Application No. 15181419.1 dated Sep. 29, 2015.
Official Communication for European Patent Application No. 15184764.7 dated Dec. 14, 2015.
Official Communication for Great Britain Patent Application No. 1404486.1 dated May 21, 2015.
Official Communication for Great Britain Patent Application No. 1404486.1 dated Aug. 27, 2014.
Official Communication for Great Britain Patent Application No. 1404489.5 dated May 21, 2015.
Official Communication for Great Britain Patent Application No. 1404489.5 dated Aug. 27, 2014.
Official Communication for Great Britain Patent Application No. 1404499.4 dated Jun. 11, 2015.
Official Communication for Great Britain Patent Application No. 1404499.4 dated Aug. 20, 2014.
Official Communication for Netherlands Patent Application No. 2012417 dated Sep. 18, 2015.
Official Communication for Netherlands Patent Application No. 2012421 dated Sep. 18, 2015.
Official Communication for Netherlands Patent Application No. 2012438 dated Sep. 21, 2015.
Official Communication for New Zealand Patent Application No. 622473 dated Jun. 19, 2014.
Official Communication for New Zealand Patent Application No. 622473 dated Mar. 27, 2014.
Official Communication for New Zealand Patent Application No. 622513 dated Apr. 3, 2014.
Official Communication for New Zealand Patent Application No. 628161 dated Aug. 25, 2014.
Official Communication for U.S. Appl. No. 13/827,491 dated Dec. 1, 2014.
Official Communication for U.S. Appl. No. 13/827,491 dated Jun. 22, 2015.
Official Communication for U.S. Appl. No. 13/827,491 dated Oct. 9, 2015.
Official Communication for U.S. Appl. No. 14/141,252 dated Oct. 8, 2015.
Official Communication for U.S. Appl. No. 14/225,006 dated Sep. 10, 2014.
Official Communication for U.S. Appl. No. 14/225,006 dated Sep. 2, 2015.
Official Communication for U.S. Appl. No. 14/225,006 dated Dec. 21, 2015.
Official Communication for U.S. Appl. No. 14/225,006 dated Feb. 27, 2015.
Official Communication for U.S. Appl. No. 14/225,084 dated Sep. 11, 2015.
Official Communication for U.S. Appl. No. 14/225,084 dated Sep. 2, 2014.
Official Communication for U.S. Appl. No. 14/225,084 dated Feb. 20, 2015.
Official Communication for U.S. Appl. No. 14/225,084 dated Jan. 4, 2016.
Official Communication for U.S. Appl. No. 14/225,160 dated Feb. 11, 2015.
Official Communication for U.S. Appl. No. 14/225,160 dated Aug. 12, 2015.
Official Communication for U.S. Appl. No. 14/225,160 dated May 20, 2015.
Official Communication for U.S. Appl. No. 14/225,160 dated Oct. 22, 2014.
Official Communication for U.S. Appl. No. 14/225,160 dated Jul. 29, 2014.
Official Communication for U.S. Appl. No. 14/306,138 dated Mar. 17, 2016.
Official Communication for U.S. Appl. No. 14/306,138 dated Dec. 24, 2015.
Official Communication for U.S. Appl. No. 14/306,138 dated Dec. 3, 2015.
Official Communication for U.S. Appl. No. 14/306,147 dated Dec. 24, 2015.
Official Communication for U.S. Appl. No. 14/306,147 dated Jun. 3, 2016.
Official Communication for U.S. Appl. No. 14/306,147 dated Mar. 4, 2016.
Official Communication for U.S. Appl. No. 14/306,154 dated Feb. 1, 2016.
Official Communication for U.S. Appl. No. 14/306,154 dated Mar. 17, 2016.
Official Communication for U.S. Appl. No. 14/319,161 dated Jan. 23, 2015.
Official Communication for U.S. Appl. No. 14/451,221 dated Oct. 21, 2014.
Official Communication for U.S. Appl. No. 14/463,615 dated Sep. 10, 2015.
Official Communication for U.S. Appl. No. 14/463,615 dated May 12, 2016.
Official Communication for U.S. Appl. No. 14/463,615 dated Nov. 13, 2014.
Official Communication for U.S. Appl. No. 14/463,615 dated Mar. 21, 2016.
Official Communication for U.S. Appl. No. 14/463,615 dated May 21, 2015.
Official Communication for U.S. Appl. No. 14/463,615 dated Jan. 28, 2015.
Official Communication for U.S. Appl. No. 14/463,615 dated Dec. 9, 2015.
Official Communication for U.S. Appl. No. 14/479,863 dated Dec. 26, 2014.
Official Communication for U.S. Appl. No. 14/483,527 dated Jun. 22, 2015.
Official Communication for U.S. Appl. No. 14/483,527 dated Jan. 28, 2015.
Official Communication for U.S. Appl. No. 14/483,527 dated Oct. 28, 2015.
Official Communication for U.S. Appl. No. 14/552,336 dated Jul. 20, 2015.
Official Communication for U.S. Appl. No. 14/562,524 dated Nov. 10, 2015.
Official Communication for U.S. Appl. No. 14/562,524 dated Sep. 14, 2015.
Official Communication for U.S. Appl. No. 14/562,524 dated Feb. 18, 2016.
Official Communication for U.S. Appl. No. 14/571,098 dated Nov. 10, 2015.
Official Communication for U.S. Appl. No. 14/571,098 dated Mar. 11, 2015.
Official Communication for U.S. Appl. No. 14/571,098 dated Aug. 24, 2015.

(56) References Cited

OTHER PUBLICATIONS

Official Communication for U.S. Appl. No. 14/571,098 dated Aug. 5, 2015.
Official Communication for U.S. Appl. No. 14/631,633 dated Sep. 10, 2015.
Official Communication for U.S. Appl. No. 14/676,621 dated Oct. 29, 2015.
Official Communication for U.S. Appl. No. 14/676,621 dated Jul. 30, 2015.
Official Communication for U.S. Appl. No. 14/746,671 dated Nov. 12, 2015.
Official Communication for U.S. Appl. No. 14/800,447 dated Dec. 10, 2015.
Official Communication for U.S. Appl. No. 14/800,447 dated Mar. 3, 2016.
Official Communication for U.S. Appl. No. 14/800,447 dated Jun. 6, 2016.
Official Communication for U.S. Appl. No. 14/813,749 dated Sep. 28, 2015.
Official Communication for U.S. Appl. No. 14/842,734 dated Nov. 19, 2015.
McClave et al., "Statistics for Business and Economics", 2001, pp. 86-96.
Official Communication for U.S. Appl. No. 14/463,615 dated Aug. 19, 2016.
Official Communication for U.S. Appl. No. 14/811,649 dated May 18, 2016.

\* cited by examiner

FIG. 5D

CHART

Search

Brand
Packtype
Season (1)
X VAL-Valentines

Scan UPC
SFG UPC

Acme DC
Customer Distributor
Customer DC
Retailer
Retailer Division

Acme DC Metrics
Customer DC Metrics
Retail Metrics

Year
Compare by

☐ BTS - Back to School
☐ CHR - Christmas
☐ EAS - Easter
☐ FAL - Grocery Fall
☐ GWN - Grocery Winter
☐ HAL - Halloween
☐ NS - Non-Seasonal
☐ NSI - Non-Seasonal Innovat
☐ RWB - Red White & Blue
☐ SNS - Seas Non-Spec
☐ SUM - Summer
☑ VAL - Valentines
☐ WIN - Winter

SELECT A METRIC TO GET STARTED.

Save  Email

Chart

MY INVESTIGATIONS

| | | |
|---|---|---|
| Valentines Day | ☆ | ✕ |
| Wasted Inventory | ☆ | ✕ |
| Halloween | ☆ | ✕ |
| Winter | ☆ | ✕ |

SHARED INVESTIGATIONS

| | SHARED BY | | |
|---|---|---|---|
| Halloween Wasted Inventory | John | ☆ | |
| Easter | Andrew | ☆ | |
| Winter Wasted Inventory | Me | ☆ | ✕ |
| Summer | Joanne | ☆ | ✕ |

+ New Investigation

FIG. 8B

GRAPHICAL USER INTERFACE FOR A DATABASE SYSTEM

CROSS-REFERENCE TO RELATED APPLICATIONS

This application hereby incorporates by reference in their entireties, but does not claim priority to, each of the following:

U.S. patent application Ser. No. 15/077,650 entitled "Systems and Methods for Attribute Analysis of One or More Databases" filed Mar. 22, 2016 ("the '650 application.")

U.S. patent application Ser. No. 14/584,961 entitled "System and Method of Generating Data Points From One or More Data Stores of Data Items for Chart Creation and Manipulation" filed Dec. 29, 2014 ("the '961 application.")

U.S. patent application Ser. No. 14/841,338 entitled "System For Providing Dynamic Linked Panels In User Interface" filed Aug. 31, 2015 ("the '338 application.")

U.S. patent application Ser. No. 14/874,690 entitled "Domain-specific Language for Dataset Transformations" filed Oct. 5, 2014 ("the '690 application.")

BACKGROUND

In the area of computer-based platforms, a database may be queried.

SUMMARY

The systems, methods, and devices described herein each have several aspects, no single one of which is solely responsible for its desirable attributes. Without limiting the scope of this disclosure, several non-limiting features will now be discussed briefly.

One embodiment includes a computer-implemented method for a graphical user interface to query an item database, the computer-implemented method comprising: receiving, from a user interface, a first input comprising data indicative of item related information; receiving, from the user interface, a statistical measure input comprising data indicative of statistical related information; identifying an item data source based at least on the first input; identifying a statistical data source based at least on the statistical measure input; constructing a first query of the item data source and the statistical data source based at least on the first input and the statistical measure input; executing the first query to retrieve first results; and presenting the first results in the user interface.

In some embodiments, the computer-implemented method of the preceding paragraph can include a combination or sub-combination of features. The computer-implemented method can further include: executing a second query of at least the statistical data source to retrieve second results, the second results comprising a plurality of groupings; determining a first set of groupings from the plurality of groupings based at least on a predetermined number of groupings; executing a third query of at least the statistical data source to retrieve third results, wherein the third results are grouped by the first set of groupings; and presenting the third results in the user interface.

Another embodiment includes a non-transitory computer storage medium for storing computer executable instructions that when executed by a computer hardware processor perform operations comprising: receiving, from a user interface, a first input comprising data indicative of entity related information; receiving, from the user interface, a statistical measure input comprising data indicative of statistical related information; identifying an entity data source based at least on the first input; identifying a statistical data source based at least on the statistical measure input; constructing a first query of the entity data source and the statistical data source based at least on the first input and the statistical measure input; executing the first query to retrieve first results; and presenting the first results in the user interface.

In some embodiments, the non-transitory computer storage medium of the preceding paragraph can include a combination or sub-combination of features. The operations can further include: receiving, from the user interface, a second input comprising data indicative of item related information; identifying an item data source based at least on the second input; constructing a second query of the item data source, the entity data source, and the statistical data source based at least on the first item input, the second input, and the statistical measure input; executing the second query to retrieve second results; and presenting the second results in the user interface.

Another embodiment includes a computing system comprising: one or more hardware computer processors programmed, via executable code instructions, to: receive, from a user interface, a first input comprising data indicative of item related information; receive, from the user interface, a statistical measure input comprising data indicative of statistical related information; identify an item data source based at least on the first input; identify a statistical data source based at least on the statistical measure input; construct a first query of the item data source and the statistical data source based at least on the first input and the statistical measure input; execute the first query to retrieve first results; and present the first results in the user interface.

In some embodiments, the computing system of the preceding paragraph can include a combination or sub-combination of features. The one or more hardware processors can be further programmed to: receive, from the user interface, a second input comprising data indicative of entity related information; identify an entity data source based at least on the second input; execute a second query of at least the item data source and the statistical data source to retrieve second results, wherein the second query is based at least on the second input; and present the second results in the user interface.

BRIEF DESCRIPTION OF THE DRAWINGS

The following drawings and the associated descriptions are provided to illustrate embodiments of the present disclosure and do not limit the scope of the claims. Aspects and many of the attendant advantages of this disclosure will become more readily appreciated as the same become better understood by reference to the following detailed description, when taken in conjunction with the accompanying drawings, wherein:

FIGS. 5A-5N, 6A-6E, 7, and 8A-8B illustrate example user interfaces of the query system, according to some embodiments of the present disclosure.

DETAILED DESCRIPTION

Figure 1:
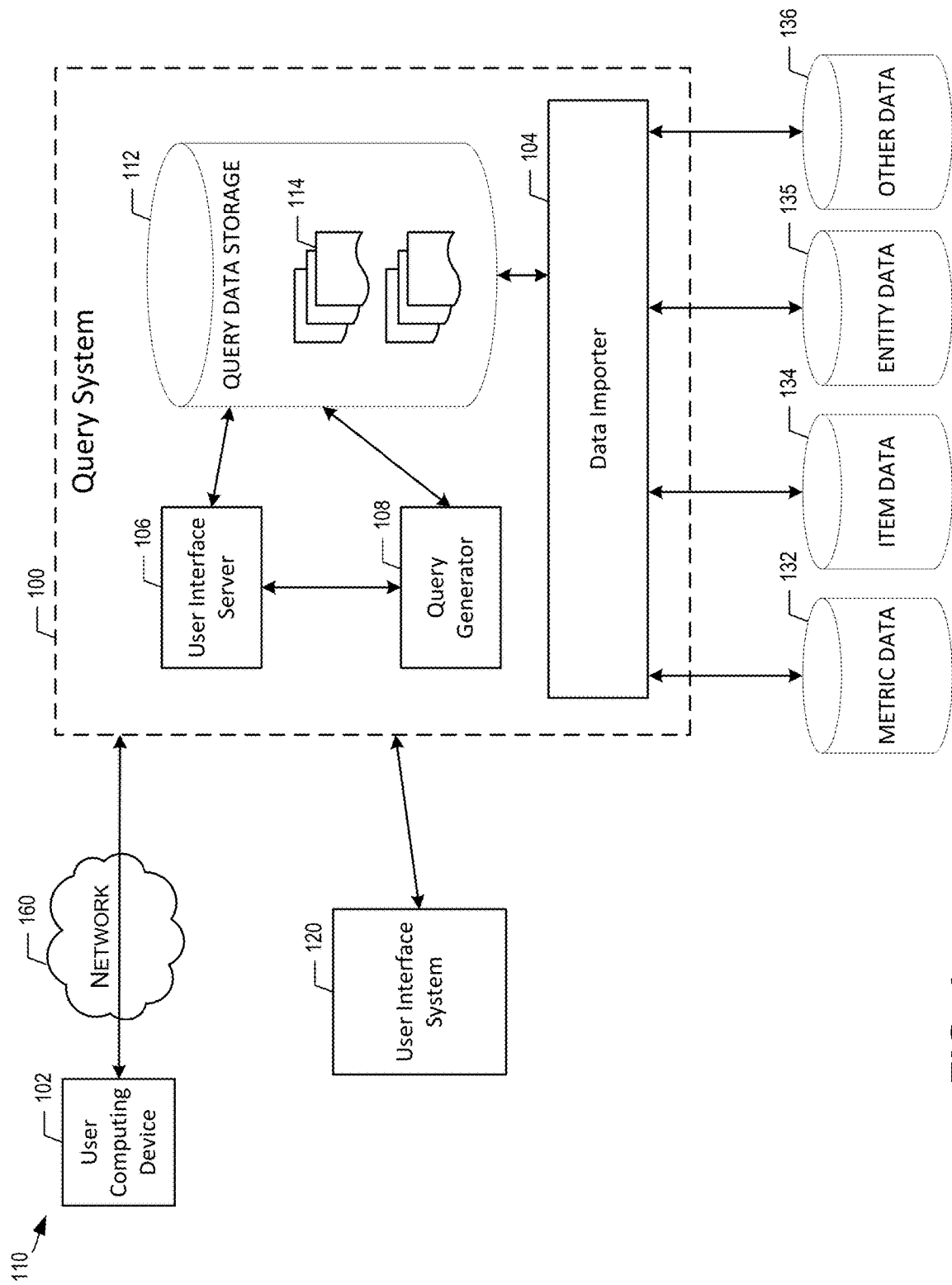
FIG. 1 is a block diagram illustrating an example query system, according to some embodiments of the present disclosure.

Although certain preferred embodiments and examples are disclosed below, inventive subject matter extends beyond the specifically disclosed embodiments to other alternative embodiments and/or uses and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

Ontology: Stored information that provides a data model for storage of data in one or more databases. For example, the stored data may comprise definitions for object types and property types for data in a database, and how objects and properties may be related.

Database: Any data structure (and/or combinations of multiple data structures) for storing and/or organizing data, including, but not limited to, relational databases (e.g., Oracle databases, mySQL databases, etc.), non-relational databases (e.g., NoSQL databases, etc.), in-memory databases, spreadsheets, as comma separated values (CSV) files, eXtendible markup language (XML) files, TeXT (TXT) files, flat files, spreadsheet files, and/or any other widely used or proprietary format for data storage. Databases are typically stored in one or more data stores. Accordingly, each database referred to herein (e.g., in the description herein and/or the figures of the present application) is to be understood as being stored in one or more data stores. The terms "database," "table," and "data source" may be used interchangeably in the present disclosure.

Data Store: Any computer readable storage medium and/or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., solid state drives, random-access memory (RAM), etc.), and/or the like. Another example of a data store is a hosted storage environment that includes a collection of physical data storage devices that may be remotely accessible and may be rapidly provisioned as needed (commonly referred to as "cloud" storage). As used herein, a data source may refer to a table in a relational database, for example.

Data Object (Object), Data Item (Item), or Data Entity (Entity): A data container for information. A data object may be associated with a number of definable properties (as described herein). A data object may represent a specific thing, or a group of things, in the world. For example, a data object may represent an item such as a particular type of product, a food item, person, a place, an organization, an account, a computer, an activity, or other noun. In a food item context, an item may correspond to a specific food product. Example entities include an organization, a distribution center, a distributor, a retailer, a retailer division, a location establishment, or a store. In some embodiments, an item may correspond to a particular item identifier. In the food example, an item identifier may be a Universal Product Code ("UPC"). In some embodiments, if a food product includes an ingredient list A at time one, and the food product includes an ingredient list B at time two (which differs from ingredient list A by at least one ingredient), then the item corresponding to the food product at time one may differ from the item corresponding to the food product at time two. A data item may represent an event that happens at a point in time or for a duration. A data item may represent a document or other unstructured data source such as an e-mail message, a news report, or a written paper or article. Each data item may be associated with a unique identifier that uniquely identifies the data item. The terms "data object," "data item," "data entity," "item," "object," and "entity" may be used interchangeably and/or synonymously in the present disclosure.

Item (or Entity or Object) Type: Type of a data item (for example, Person, Event, or Document). Data item types may be defined by an ontology and may be modified or updated to include additional data item types. A data item definition (for example, in an ontology) may include how the data item is related to other data items, such as being a sub-data item type of another data item type (for example, an agent may be a sub-data item of a person data item type), and the properties the data item type may have.

Properties: Also referred to herein as "metadata" of data items. A property of a data item may include any item of information associated with, and/or relevant to, the data item. At a minimum, each property of a data item has a property type and a value or values. For example, properties associated with a person data item may include a name (for example, John Doe), an address (for example, 123 S. Orange Street), and/or a phone number (for example, 800-0000), among other properties. In another example, properties associated with a computer data item may include a list of users (for example, user1, user 2, and the like), and/or an IP (internet protocol) address, among other properties.

Property Type: The type of data a property is, such as a string, an integer, or a double. Property types may include complex property types, such as a series data values associated with timed ticks (for example, a time series), and the like.

Property Value: The value associated with a property, which is of the type indicated in the property type associated with the property. A property may have multiple values.

Attribute: A string, word, group of words, and/or tag associated with an item. For example, an item, such as a candy bar, may be associated with ingredients and/or a number of descriptors, name of product, flavors, season of the product (e.g., Valentine's Day or the Fourth of July), etc. Attributes of the item describe and/or relate to the item. Example attributes for a particular item, such as a particular candy bar, may be one or more of: "crunchy," "chocolate," "peanut butter," "whole grain," "bold," "noble," "layered,"

etc. In some embodiments, "peanut butter" and "peanut_butter" may refer to the same attribute and/or the former may refer to the presentation of the attribute in a user interface and the latter may refer to representation of the attribute in the underlying database and/or system. In some embodiments, an attribute of an item may be a property of the item. Further, one or more attributes may be associated with a particular item and/or two or more items may be associated same attribute. An example attribute may be represented by a label that corresponds to multiple words and/or phrases associated with same attribute. For example, "crumbly" may be the label for a particular attribute, which is representative of multiple words such as "crumbled," "crumbly," and "crumble." An advantage of the algorithms and/or techniques described herein is that the determined attributes may be high-level concepts associated with an item. In a food item example, attributes for a food item may correspond to concepts that are not directly related to a flavor or ingredient, such as, for example, "noble," "liberty," "peruvian," etc.

Category: The class of an item. In some embodiments, the category of an item may be a property of the item. For example, particular items may be determined to correspond to one or more categories. Continuing with the food item example, the various categories may correspond to "candy," "salty snacks," "cookie," etc. In some embodiments, an item may be determined to correspond to two or more categories. In other embodiments, categories may correspond to the particular environment such as electronics, manufacturing, or other areas.

Product: Refers to an item group. In some embodiments, "product" may be a property of the item. For example, particular items may be determined to correspond to one or more products. Two or more items may correspond to the same product. Continuing with the food example, the product may be "Acme's cookies," which may include two or more items that are associated with "Acme's cookies," but each item may have different ingredients (such as different flavors for each item), different properties, and/or item identifiers. Usage of the product grouping may allow several items and/or UPCs to be analyzed together. For example, different UPCs may refer to the regular, large, and king sizes (i.e., a pack type) of essentially the same item, and usage of the product group allows the particular items to be analyzed and/or queried together. In some embodiments, the product group may allow a broad number of items to be associated together, such as all or most of the items by a particular manufacturer, retailer, and/or organization to be grouped together. As used herein, "brand," "item group," and "product" may be used interchangeably. Product and category may be similar in that each respective term refers to a higher level description of an item.

Investigation: A collection of data corresponding to a query and/or visualization. For example, the collection may correspond to a data structure that specifies one or more query parameters associated with user interface options, as described herein. The collection of data and/or parameters may be communicated and/or shared with another user or recipient. For example, the query system may share an investigation via a uniform resource identifier with the parameters and/or a unique identifier for the particular query and/or visualization. Additionally or alternatively, a shared investigation may be available to another user and/or recipient via a user interface of a query system. In some embodiments, the collection of data may include the results corresponding to the query and/or the results may be stored in a data source.

Overview

Analysts may be interested in investigating enormous data sets to determine insights associated with items from the data sets. Additionally or alternatively, users may be interested in viewing integrated summary data from the enormous data sets. The data sets may be from multiple disparate data sources that include gigabytes, terabytes, or even petabytes of data. The integrated data sets may need to be queried to provide a dynamic investigation and/or summary user interface.

Disclosed herein are systems and methods that may be used to advantageously provide user interfaces that enable a user to investigate and/or view integrated data sets. For example, the user interface may enable a user to investigate and/or view summary data regarding one or more stages in a workflow. Continuing with the workflow stages example, a first stage may be associated with item data, the item data may include attributes, which are described herein. A second example stage may be associated with entity data, the entity data may correspond to one or more establishment locations for distributing items and/or that are otherwise associated with the items. A third example stage is associated with statistical measures associated with one or more items and/or entities. Accordingly, the item (first) stage may be associated with the (third) statistical measure stage; the first, the entity (second), and the third stages may be associated together, and so forth. The user interface may respond to user selections of options associated with one or more of the first, second, and/or third example stages. The user interface may also include filtering and/or enhancement options to filter and/or group the data. Accordingly, user may investigate and/or view summary data associated with integrated data from the first, second, and/or third example stages.

In other aspects, disclosed herein are systems and methods that may be used to advantageously receive user interface selections and dynamically convert those selections into database queries. For example, a server may receive user interface selections for: item attributes and/or other item-related data, entity identifiers and/or other entity-related data, and/or statistical measure inputs. Continuing with the example, the server may determine one or more queries and/or a query including one or more subqueries from the user interface selections. At times, the present disclosure may describe two or more queries; however, any description of two or more queries may correspond a single query with one or more subqueries. The one or more example queries including data sources and/or tables to join, indices to use, and/or result set fields from the data sources and/or tables. Additionally or alternatively, the server executes multiple queries. For example, a first query may be executed to find a predetermined number of results, and a second query may be executed to retrieve the data corresponding to those results and the results may be presented to the user. In some embodiments, results that are not within the predetermined number of results may be aggregated together to generate aggregated data that is presented to the user.

In some embodiments, the attribute and/or item data may be extracted from large data sources. For example, the large data sources may include item data sets in a row and columnar data format. The data from the large data sources may be processed to extract attributes and/or other data to be used in the user interfaces. Example data that may be processed includes Nielsen Product Reference Data. More information regarding attributes, the extraction of attributes, and/or the use of the attribute and/or item data may be found in the '650 application, e.g., see paragraphs [0041]-[0140].

Example Query System

FIG. 1 illustrates a query system 100, according to some embodiments of the present disclosure. In the embodiment of FIG. 1, the database environment 110 includes a network 160, a query system 100, a user computing device 102, a user interface system 120, and data storage devices, such as a metrics data storage 132, an item data storage 134, an entity data storage 135, and/or other data storage devices 136. Various communications between these devices are illustrated. For example, the user computing device 102 may send user input, such as user interface selections, to the query system 100.

The example query system 100 includes a data importer 104, a user interface server 106, a query generator 108, and query data storage 112. The data importer 104 may import data from the item data storage 134 such as attributes and/or other item data. The data importer 104 may also import metrics and/or statistical measures from the metrics data storage 132, which may contain metrics and/or statistical measures such as sales data, inventory data, days of supply, movement data, and/or forecast data associated with the items. The data importer 104 may also import entity data from the entity data storage 135. The data importer 104 may store the data 114 in the query data storage 112. For example, the data 114 may be inserted into one or more data sources and/or tables such as an item data source, a statistical data source, and/or an entity data source. In some embodiments, a user may perform operations via the user interface server 106 such as selecting one or more user interface options and/or predefined investigations, as described herein. For example, the user interface server 106 and/or the query generator 108 may receive user input to generate a query for the query data storage 112.

In some embodiments, the query system 100 communicates with the user interface system 120. For example, the user interface system 120 may allow an administrator to generate and/or update the available user interface options of the query system 100, which is described herein.

Example User Interface and Querying Processes

Figure 2:
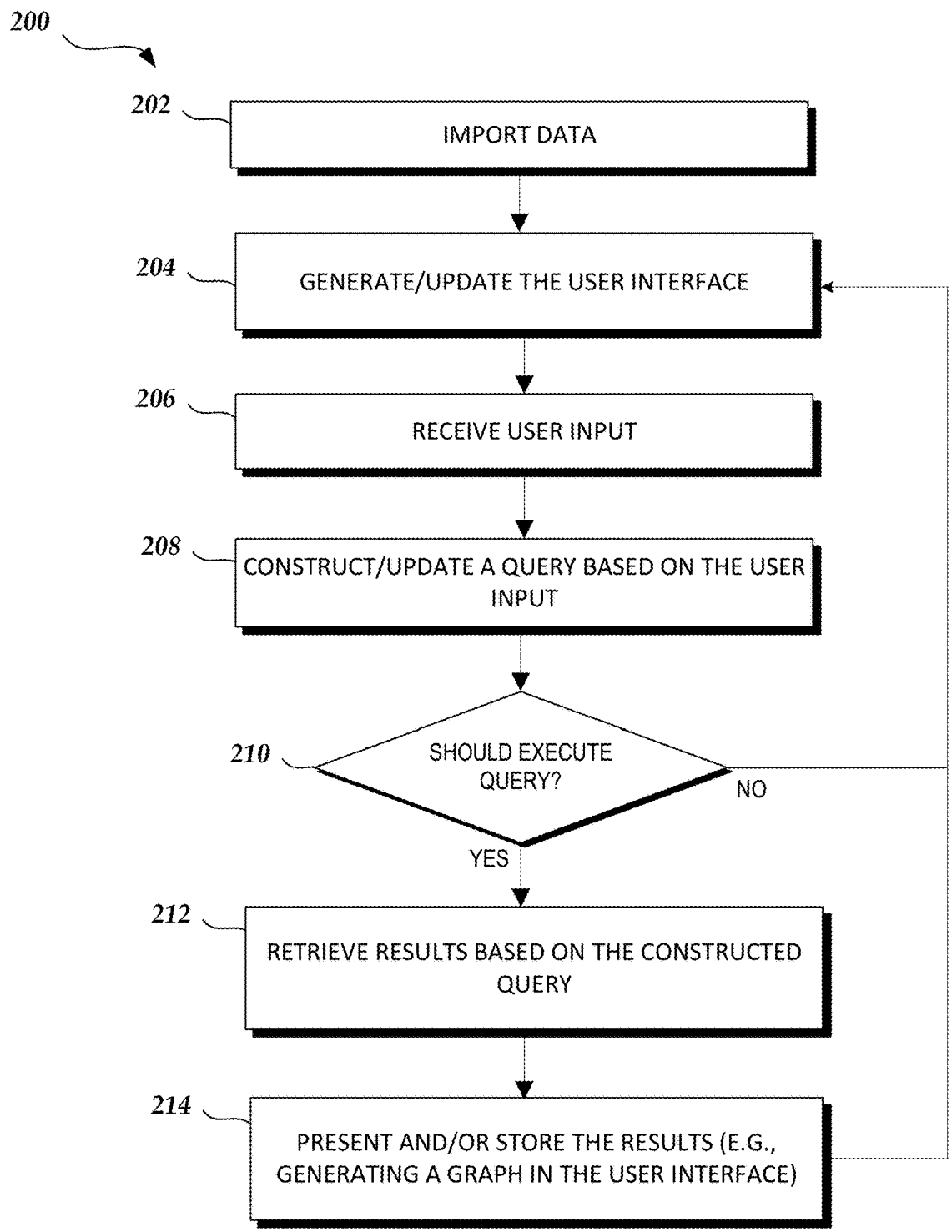
FIG. 2 is a flowchart illustrating an example user interface and querying process overview, according to some embodiments of the present disclosure.

FIG. 2 is a flowchart of an example method of generating user interfaces and/or querying data, according to some embodiments of the present disclosure. Although the method 200 is described in conjunction with the systems of FIG. 1, any system configured to perform the method, in any order, is within the scope of this disclosure. The method 200 may be performed by the systems 100 and/or 120 of FIG. 1, such as the various components of the query system 100 of FIG. 1 as discussed herein, including the data importer 104, the user interface server 106, and/or the query generator 108. Depending on the embodiment, the method 200 may include fewer or additional blocks and/or the blocks may be performed in an order different than is illustrated. Blocks of FIG. 2 may be similar to blocks of FIG. 3. For example, the techniques and/or algorithms of a block of FIG. 2 may describe the techniques and/or algorithms that can be used at a block of FIG. 3 or vice versa.

Beginning at block 202, the data importer 104 imports data into the query data storage. Example data includes item data, entity data, metric and/or statistical data, which may originate from multiple disparate sources. The example data may be accessed and/or imported in a database format. The data importer 104 may aggregate data for importing data into the query data storage 112. Example aggregation of data includes aggregating the statistical data and/or metrics data by week or any other time period; the statistical data and/or metrics data may also be aggregated by entity, such as aggregating data at various levels: an entity level such as a distributor or retailer level, a sub-entity level such as a distributor distribution center or a retailer division, and/or a sub-sub-entity level such as a particular store. The query data storage may also include indices associated with the various data sources. Accordingly, the data importer 104 inserts data into the data sources, which in turn may update one or more indices.

In some embodiments, the data importer 104 pre-processes and/or further aggregates the data. For example, data associated with particular queries and/or visualizations may be precomputed by the data importer 104 for improvements in efficiency. For example, the data importer 104 may import data into a seasons level table, a brand level table, and a pack type table. Accordingly, where applicable, the query generator 108 may select one of the precomputed tables for the associated query if available, and the query generator 108 may use default tables if there is not a precomputed table available for the particular query.

At block 204, the user interface server 106 generates a user interface. As described herein, the generated user interfaces may enable user to query item data, entity data, statistical related data, and/or other item-related data. Example statistical related information includes statistical and/or metric data of one or more items and/or items such as days of supply, forecast movement in dollars, forecast movement in eaches, forecast movement in salable final goods, inbound movement in dollars, inbound movement in eaches, inbound movement in salable final goods, inventory dollars, inventory in eaches, inventory in salable final good, and/or outbound movement in dollars, outbound movement in eaches, and/or outbound movement in salable final goods. The example statistical related information may be stored as time series data by a unit of time such as by day, week, month, quarter, etc. Example statistical measures of the statistical related information includes a count of inventory, sales in dollars and/or other currency, and/or an average mean, median, or mode of item and/or entity data. The generated user interfaces are described in further detail with reference to FIGS. 5A-5N, 6A-6E, and 7. In particular, the generated user interface may correspond to FIGS. 5A and/or 5B such as the presentation of user interface options without a data visualization upon initiation. Alternatively, the generated user interface, which may include one or more panels, may be loaded from storage and/or based on pre-existing parameters, as described herein. For example, a user may "share" their user interface with another user. In some embodiments, "sharing" a user interface and/or an investigation may consist of duplicating parameters for the original user interface and providing the duplicated parameters and/or an identifier representing those parameters to another user. An example of a user sharing a user interface and/or investigation is described in further detail with reference to FIG. 5N. The user interface server 106 may pre-load data from the query data storage 112 to expedite user interface searching. For example, user interface server 106 loads item, attribute, and/or entity data to enable near-instantaneous searching of those options within the user interface, as illustrated with reference to FIG. 5C.

In some embodiments, the user interface options may be pre-defined by an administrator using the user interface system 120. Additional information regarding defining and/or or generating user interfaces, such as particular techniques, processes, and/or algorithms thereof, and the user interface system 120 is found in U.S. patent application Ser. No. 14/841,338 and U.S. patent application Ser. No. 14/874,690. For example, the '338 application describes various systems and methods for defining and/or generating user interfaces in at least paragraphs [0020]-[0080], among others. As another example, the '690 application describes various systems and methods for transforming datasets for user interfaces in at least paragraphs [0015]-[0089], among others.

At block 206, the user interface server 106 receives the user input via the user interface. For example, a user may select one or more options within the user interface. Example options that may be selected include item options, entity options, statistical measure options, and/or miscellaneous options such as an option for filtering by year and/or grouping by some parameter. Example item options include an attribute, a brand, pack type, or UPC identifier, among others. Example entity options include specific entities that consist of establishment locations, individual establishment locations, upstream producers of items, and/or downstream distributors of those items, which may correspond to various stages of production to distribution for an item and/or an item's lifecycle. By way of a specific example of user selected options, a user may specify input options for: the "Back to School" seasonal attribute, a time period such as a particular year of interest, an entity distributor, and/or a statistical measure such as inventory saleable finished goods, as described herein. Example time periods for filtering including a period of days, weeks, months, years, and/or some combination thereof. While these options may be described in a single iteration of block 206, it will be appreciated that the collection of these options may be determined after various loops of the blocks of the example method 200, as described herein. For example, the user interface server 106 may: receive first user input, update the user interface a first time, receive second user input, update the user interface a second time, execute one or more queries based on the first and second user input, and then present the results of the queries in the user interface. Various methods for receiving user input and/or various types of user input are described in further detail with reference to FIGS. 5A-5N, 6A-6E, and 7.

Figure 7:
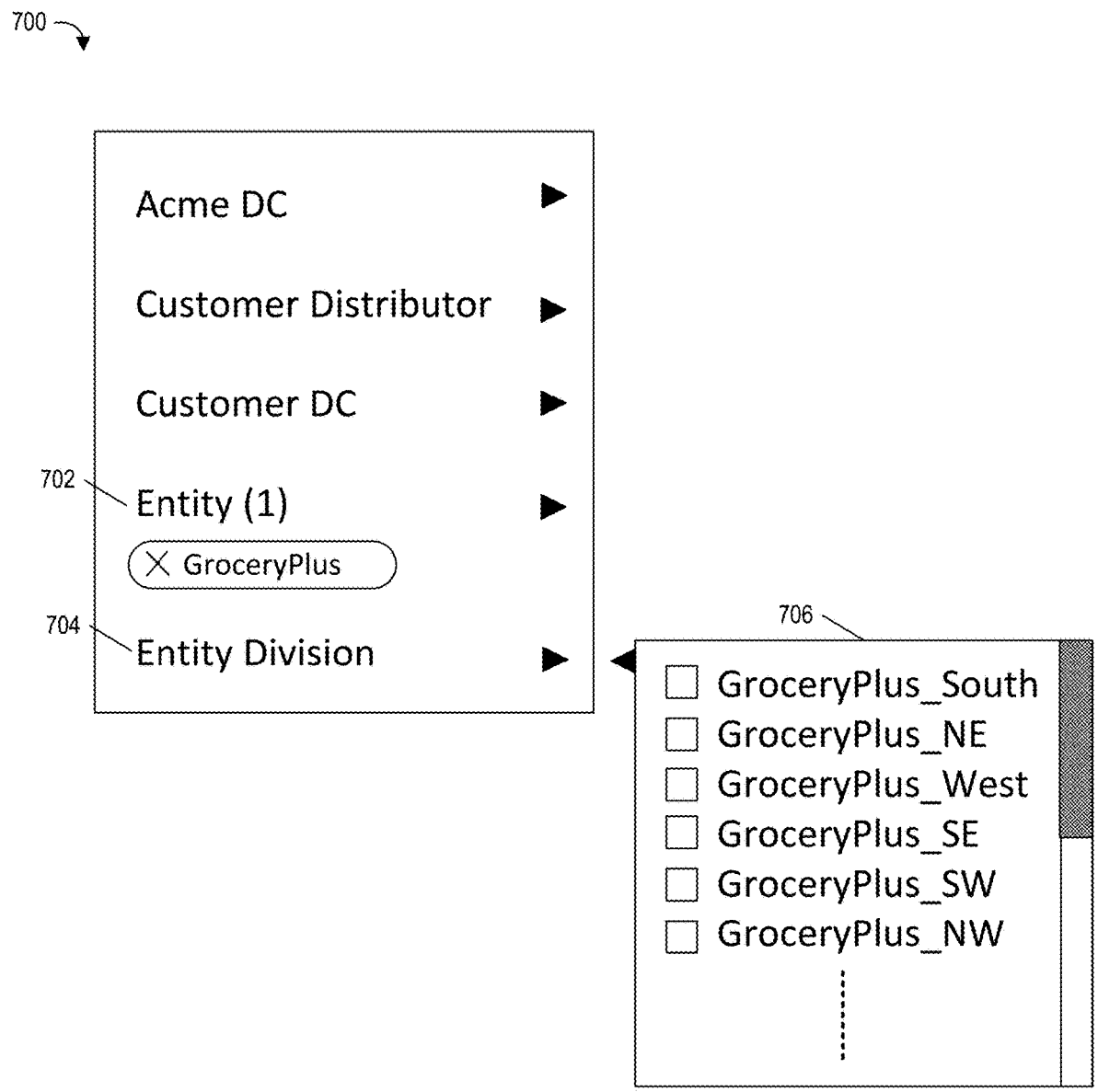

The user interface server 106 may update the user interface in response to the received user input at block 206. For example, user selection of one option may update the available options within the user interface. As illustrated in FIG. 7, since the "GroceryPlus" entity option has been selected, the user interface server 106 may filter and/or limit the options 706 to those divisions associated with the "GroceryPlus" entity.

In some embodiments, the user interface server 106 receives user input associated with a person or a position. For example, item and/or entity data may be associated with a person or a position. In the example, the person or position may have responsibilities associated with the underlying items and/or entities such as a Vice President responsible for distribution of one or more items. Accordingly, as described herein, the selected person or position data may be used to select corresponding data sources, generate queries, or filter the results data.

At block 208, the query generator 108 constructs a query based on the user input. The query generator may identify one or more data sources for one or more queries based on the user input. For example, the query generator 108 identifies one or more item data sources based on a selected item option; one or more entity data sources based on a selected the option; and/or one or more statistical data sources based on a selected statistical measure option. The query generator 108 may also determine one or more query fields based on the selected options. For example, the query generator 108 identifies a "season" field from an item table for querying based on the user selection of a season option. In some embodiments, the query generator 108 may access a data structure and/or mapping to identify one or more data sources and/or fields from the particular user input. Continuing with the specific example user input options corresponding to the "Back to School" seasonal attribute, a particular year of interest, an entity distributor, and/or a statistical measure such as inventory saleable finished goods, the query generator 108 may generate a query corresponding to joining an item data source, an entity data source, and an inventory data source to determine inventory saleable finished goods corresponding to "Back to School" items distributed by establishments of the particular entity distributor for the specified year. The example query may correspond to: "SELECT <fields>FROM item_table JOIN inventory_table on inventory_table.item_id=item_table.item_id JOIN entity_table on inventory_table.location_id=entity_table.location_id WHERE item_table.season_id=<input_season>AND entity_table.entity_id=<input_entity>AND inventory_table.date>=<input_date>". In the example query, the inventory_table is an example statistical data source. The example "SELECT . . . " query is illustrative and may not correspond to any specific programming language or be executable in the format shown. Additionally or alternatively, while the example "SELECT . . . " query is written as a single query, the query generator 108 may generate multiple queries corresponding to the example query. As described herein, the user input options may be translated and/or transformed into specific data sources and/or query parameters. Accordingly, the query generator 108 can dynamically generate queries based on the user input options. While the generation of the query may be described in a single iteration of block 210, similar to the receipt of user input options in multiple sub-iterations of the example method 200, it will be appreciated that completion of one or more queries may occur after various loops of the blocks of the example method 200, as described herein. For example, the query may be constructed after multiple loops of the example method 200 until the query is ready to be executed. As another example of multiple loops through the example method 200, the query generator 108 may: execute a first set of queries such as retrieving results corresponding to inventory for multiple entities; present first results of the first set of queries; receive second user input such as an additional filter option; execute a second set of queries corresponding to the second user input; present second results of the second set of queries, where the second results may be similar to the first results except the second results may reflect the additional filter option, for example; receive third user input, and so forth.

In generating the query, the query generator 108 may ignore some of the user selected options. For example, if a user selects "Retail Metrics" of 1) "sales (ea)", 2) days of supply, and 3) sales (dollars), then the data sets corresponding to the three statistical measures may each represent a potential axis of a visualization. Accordingly, the query generator 108 may generate a query to retrieve results corresponding to the three statistical measures such as 1) sales (eaches), 2) days of supply, and 3) sales (dollars). Below at block 214, the user interface server 106 and/or the query generator 108 may chart the three statistical measures and select two axes for presentations. In some embodiments, two statistical measures may be chosen arbitrarily, pseudo-randomly, by a predetermined method (such as selecting more commonly selected statistical measures or prioritized statistical measures and/or combinations of statistical measures), or by some other method. In other embodiments, the query generator 108 may generate a query to retrieve results corresponding to two statistical measures. In another example, the query generator 108 ignores a selected first party distribution center when the user selects a statistical measure such as "sales (eaches)." As used herein, "eaches" may refer to an item group as a unit of measure that it is stocked and/or sold at a retail establishment, for example. "Ea" and "eaches" may be used interchangeably in the present disclosure. Saleable finished goods may refer to the unit of measure in which the item is stocked at a distribution center (cases, pallets, etc.), for example. A saleable finished goods may be made up of one or more eaches. "Saleable finished goods" and "SFG" may be used interchangeably in the present disclosure. Accordingly, the query generator 108 may determine the axes for a particular visualization based on the user input options. Additionally or alternatively, the query generator 108 may retrieve results corresponding to multiple user options, even though the results may be incompatible for a particular visualization. In the example of retrieving results corresponding to multiple user options, the query generator 108 may then ignore some of the retrieved results if they are incompatible. In some embodiments, the user interface provides notifications to users, such as a tooltip, of incompatible user interface options and/or of sets of options that fail to return a result. Additionally or alternatively, the user interface may prevent a user from selecting incompatible filters.

At block 210, the query generator 108 determines whether to execute the one or more queries. In some embodiments, the query generator 108 determines to execute one or more queries if the queries are ready. For example, a query may not be ready to execute until a particular type of option has been selected such as a statistical measure option. If the one or more queries are ready to be executed, the query generator proceeds to block 212. Otherwise, the one or more queries are not ready and the example method 200 returns to block 204.

At block 212, the query generator 108 retrieves results based on the one or more queries. For example, the query generator 108 executes the one or more queries to retrieve the results from the query data storage 112. In some embodiments, the generated one or more queries use one or more database indices for efficient result retrieval. Continuing with the inventory saleable finished goods example, the query generator 108 executes the query to retrieve inventory saleable finished goods results. The example inventory saleable finished goods results include time series data representing inventory of goods at one or more establishments over time. Example units of time for the time series data and/or discrete data points of the time series data may correspond to daily, weekly, quarterly, annually, and or some other unit.

The query generator 108 may retrieve results from a cache if the query data is being requested for a second time. In some embodiments, the query generator 108 may cache results the first time they are retrieved and/or the first time they are retrieved for a user session. Accordingly, if the same query and/or data is requested a second time, the query generator 108 may retrieve the corresponding results the second time from a cache, which may be faster than executing the query to retrieve results from data storage.

At block 214, the user interface server 106 and/or the query generator 108 presents and/or stores the results. For example, the user interface server 106 generates a graph visualization based on the determined results at block 212. Additional information regarding presenting visualizations, such as particular techniques, processes, and/or algorithms thereof, and the user interface system 120 is found in the '338 application. For example, the '338 application describes various systems and methods for defining and/or generating visualizations in at least paragraphs [0020]-[0080], among others. Additional information regarding generating time series visualizations, such as particular techniques, processes, and/or algorithms thereof is found in the '961 application. For example, the '961 application describes various systems and methods for generating time series and other user interfaces and visualizations in at least paragraphs [0033]-[0097], among others. Example presentations of results are described in further detail with reference to FIGS. 5G-5M and 6A-6E. Additionally or alternatively, the query generator 108 may store some and/or all of the determined results in the query data storage 112.

In some embodiments, the path and/or an audit trail of an investigation may be stored. A user may duplicate one or more panels that may reflect the pattern investigation, as described in further detail with respect to FIGS. 6A-6E. Additionally or alternatively, the user interface server 106 and/or the query system 100 may automatically store each revision of a panel and/or investigation. The saved revision of a panel and/or investigations may be stored in the query data storage 112. Each revision of the panel and/or investigation may include the user input selections and other data necessary to construct the panel, the investigation, and/or associated query. In some embodiments, panel data and/or investigation data may be stored in the query data storage 112 as a binary large object (BLOB). For example, each revision of a panel may be stored in the query data storage 112. Accordingly, the query system 100 may retrieve revisions of panels and/or investigations. Thus, the user interface server 106 may allow user to backtrack or undo user interface options using a history of user input, a breadcrumb trail of user input, and/or the BLOB revisions. In some embodiments, the query system 100 may automatically determine an audit trail of panels and/or user input selections that returned results.

In some embodiments, the query system 100 is configured to generate alerts. The query system 100 may execute stored queries based on some frequency and generate alerts if a query returns a result and/or the result is above or below a particular threshold. For example, a query may determine whether inventory is below a certain threshold number. In the example, the query system 100 may generate and send a corresponding alert to a user. In some embodiments, the query system 100 may send an alert via an electronic communication. The electronic communication may include a link to the user interface, which may present results associated with the alert. Additionally or alternatively, alerts may be viewed within the user interface of the query system 100.

Figure 3:
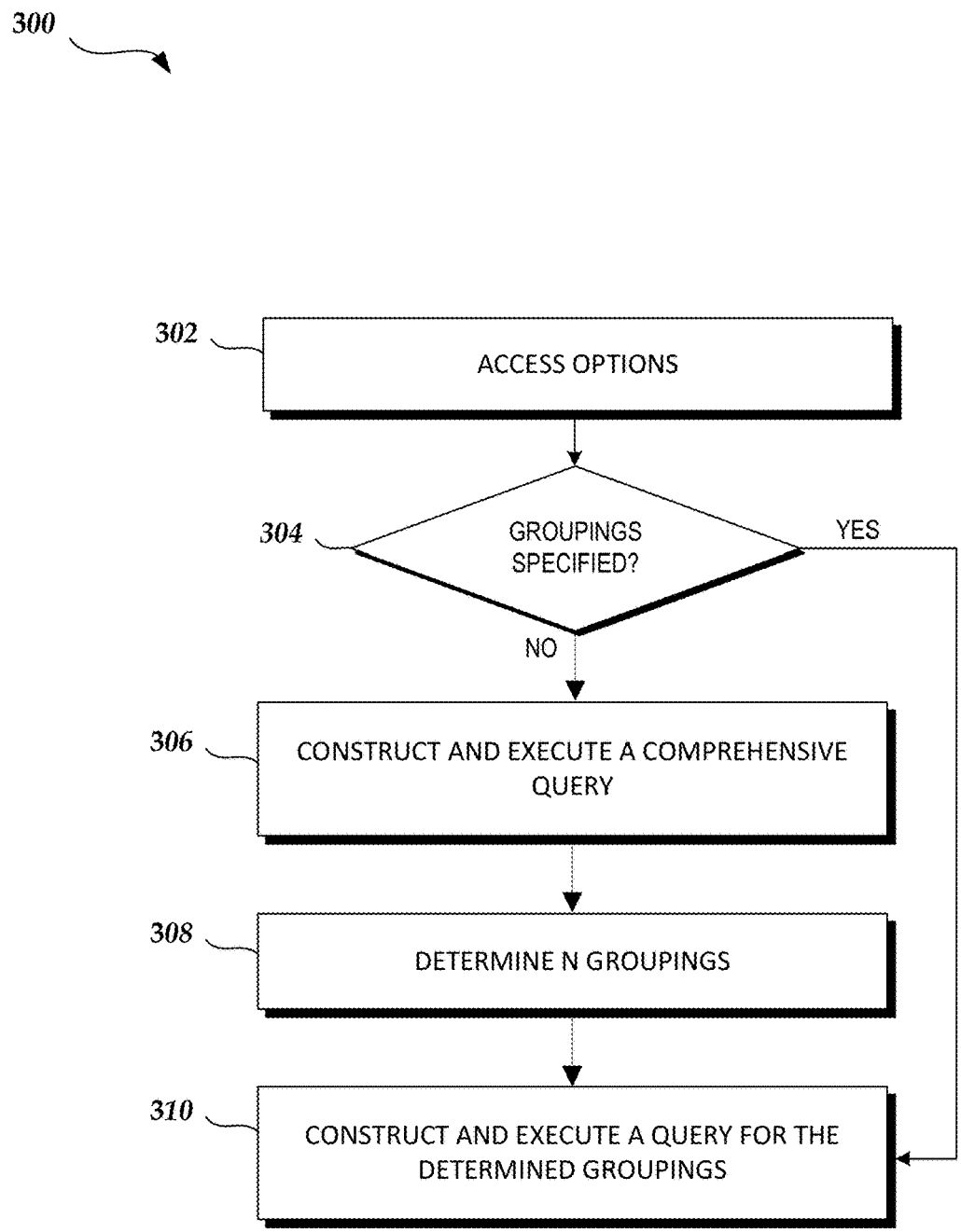
FIG. 3 is a flowchart illustrating an example group querying process, according to some embodiments of the present disclosure.

FIG. 3 is a flowchart of an example method of executing one or more queries to determine groupings of results, according to some embodiments of the present disclosure. Although the method 300 is described in conjunction with the systems of FIG. 1, any system configured to perform the method, in any order, is within the scope of this disclosure. The method 300 may be performed by the systems 100 and/or 120 of FIG. 1, such as the various components of the query system 100 of FIG. 1 as discussed herein, including the user interface server 106 and/or the query generator 108. Depending on the embodiment, the method 300 may include fewer or additional blocks and/or the blocks may be performed in an order different than is illustrated. Further, the methods of FIGS. 2 and 3 may be similar. For example, blocks 208, 210, and/or 212 of FIG. 2 may correspond to any of the blocks from FIG. 3. Aspects of the example method 300 may be described in further detail herein with reference to FIGS. 5I-5M and 6A-6E.

Beginning at block 302, the query generator 108 accesses one or more options. For example, the one or more options may correspond to user input options, as described in further detail with reference to FIG. 2, and in particular with reference to block 206. By way of a specific example of user selected options, the specific user options include: the "Red White & Blue" seasonal attribute, a particular year of interest, a specific entity, a statistical measure such as inventory saleable finished goods, and a compare-by-entity-division option.

At block 304, the query generator 108 determines whether groupings have been explicitly specified. For example, in the case of the specific example of the "Red White & Blue" set of options, the query generator 108 determines that explicit groupings are unspecified and proceeds to block 306. In an alternative case, referring to FIG. 7, the entity options 706 correspond to groupings that may be selected by user. For example, the entity options 706 correspond to different divisions of a particular entity: "GroceryPlus_South," "GroceryPlus_NE," "GroceryPlus_West," etc. Accordingly, if the options "GroceryPlus_South" and "GroceryPlus_NE" have been selected along with a corresponding compare-by-entity-division option, the query generator 108 determines that explicit groupings have been specified and proceeds to block 310.

At block 306, the query generator 108 constructs and/or executes a comprehensive query. For example, since explicit groupings are unspecified, the query generator 108 initially generates and/or executes a query to determine one or more groupings. Continuing with the specific "Red White & Blue" set of options, the query generator 108 constructs one or more queries to determine one or more groupings. Continuing with the example, the query may determine items associated with the "Red White & Blue" seasonal attribute and/or saleable finished goods, and time series data regarding inventory of those items at specific entity divisions for the particular year. In the example, where the specified entity is GroceryPlus, the query generator 108 executes and retrieves the queries time series data results for each of "GroceryPlus_South," "GroceryPlus_NE," "GroceryPlus_West," "GroceryPlus_SE," etc. The construction and/or execution of the comprehensive one or more queries may be similar to the query construction described with reference to blocks 208, 210, and/or 212 of FIG. 2. In some embodiments, the comprehensive query may include a "GROUP BY" SQL function to retrieve the data in groups.

At block 308, the query generator 108 dynamically determines a predetermined number of groupings based on the retrieved results from block 306. For example, the blocks 306 and/or 308 may be advantageous to not overwhelm the user with visualization data and/or to increase user comprehensibility. In one example, the predetermined number of groupings may be five or six groupings; however, without such a limitation, presentation of data associated with greater than six groupings (such as fifty or one hundred groupings that correspond to fifty or one hundred different time series graph lines) may decrease user understandability and/or be detrimental to the user experience. Accordingly, example methods for determining a predetermined number of groupings include selecting the highest or lowest groupings by some statistical measure, or some other method of ranking the groupings. The query generator 108 may determine a statistical measure for each grouping, such as average mean, median, or mode; then the statistical measures for each grouping may be ranked from highest-to-lowest, lowest-to-highest, or some other ranking. In the context of data that includes multiple discrete data points for each grouping, such as time series data, taking a statistical measure may be useful to rank the groupings. For example, if the discrete data points of a first grouping correspond to (1 and 100), and the data points of a second grouping correspond to (10 and 2), then by taking the average mean of the groupings, which may correspond to 50.5 and 6 of the first and second groupings, respectively, the first grouping may receive a higher ranking than the second grouping. In some embodiments, a user input option may specify the ranking order. Continue with a specific example for inventory time series data, the average mean of inventory at each entity division or grouping ("GroceryPlus_South," "GroceryPlus_NE," etc.) may be determined for the specified time period, and the average mean (inventory over the course of a year, for example) for each of the groupings are ranked. Accordingly, the query generator 108 may select "N" (a predefined number of) groupings based on the ranking. In some embodiments, the query generator 108 may treat the remaining groupings as a discrete grouping such as an "all other" and/or miscellaneous grouping. For example, if the query generator 108 selects the top five groupings, then the query generator 108 may categorize and/or treat the remaining groupings as a sixth grouping, including aggregating and/or combining data for the remaining groupings, as described herein.

At block 310, the query generator 108 constructs and/or executes a query for the determined groupings. The construction and/or execution of a query for the determined groupings may be similar to the query construction and/or execution described with reference to blocks 208, 210, and/or 212 of FIG. 2. In the case where explicit groupings were not specified as determined at block 304 and continuing with the specific "Red White & Blue" set of options, the query generator 108 constructs one or more queries to retrieve data for each of the determined groupings (for example, the groups with the highest average means: "GroceryPlus_South," "GroceryPlus_NE," etc.) such as inventory associated with the specified items and associated with the determined groupings. Moreover, the one or more queries may retrieve data for the "all other" and/or miscellaneous grouping that may correspond to the remaining groupings and the data may be aggregated as one grouping. Accordingly, the one or more queries may correspond to "second" queries and/or subqueries after blocks 306 and 308 that dynamically determined a predetermined number of groupings with the "first" query and/or subquery. In the alternative case where explicit groupings were specified at block 304, the one or more queries at block 310 may correspond to a "first" query of the previously specified groupings. For example, where the options "GroceryPlus_West" and "GroceryPlus East" were selected, one or more queries would be executed to retrieve data associated with the "GroceryPlus_West" and "GroceryPlus East" entity divisions. Example data that may be retrieved by the example method 300, and in particular block 310, are described in further detail with reference to FIGS. 5I-5M and 6A-6E. In some embodiments, the query for the determined groupings may include a "GROUP BY" SQL function to retrieve the data in groups.

In some embodiments, the query system 100 may enable a user to further investigate the "all other" and/or miscellaneous grouping. For example, a user may select a visualization corresponding to the miscellaneous grouping, and the user interface server 100 may cause presentation of results exclusively associated with the miscellaneous grouping. In some embodiments, presentation of the miscellaneous results may correspond to some or all of the example method 300. For example, if the miscellaneous grouping contains sub-groupings above a threshold, then the query generator 108 may conduct a comprehensive query on each of the sub-groupings to determine a predetermined number of groupings to be presented to the user, which may be similar to blocks 306 and/or 308. In this manner, a user may drill down into the miscellaneous groupings, which may cause some or all of the blocks of example methods 200 and/or 300 to execute recursively.

Access Control/Sharing

Figure 4:
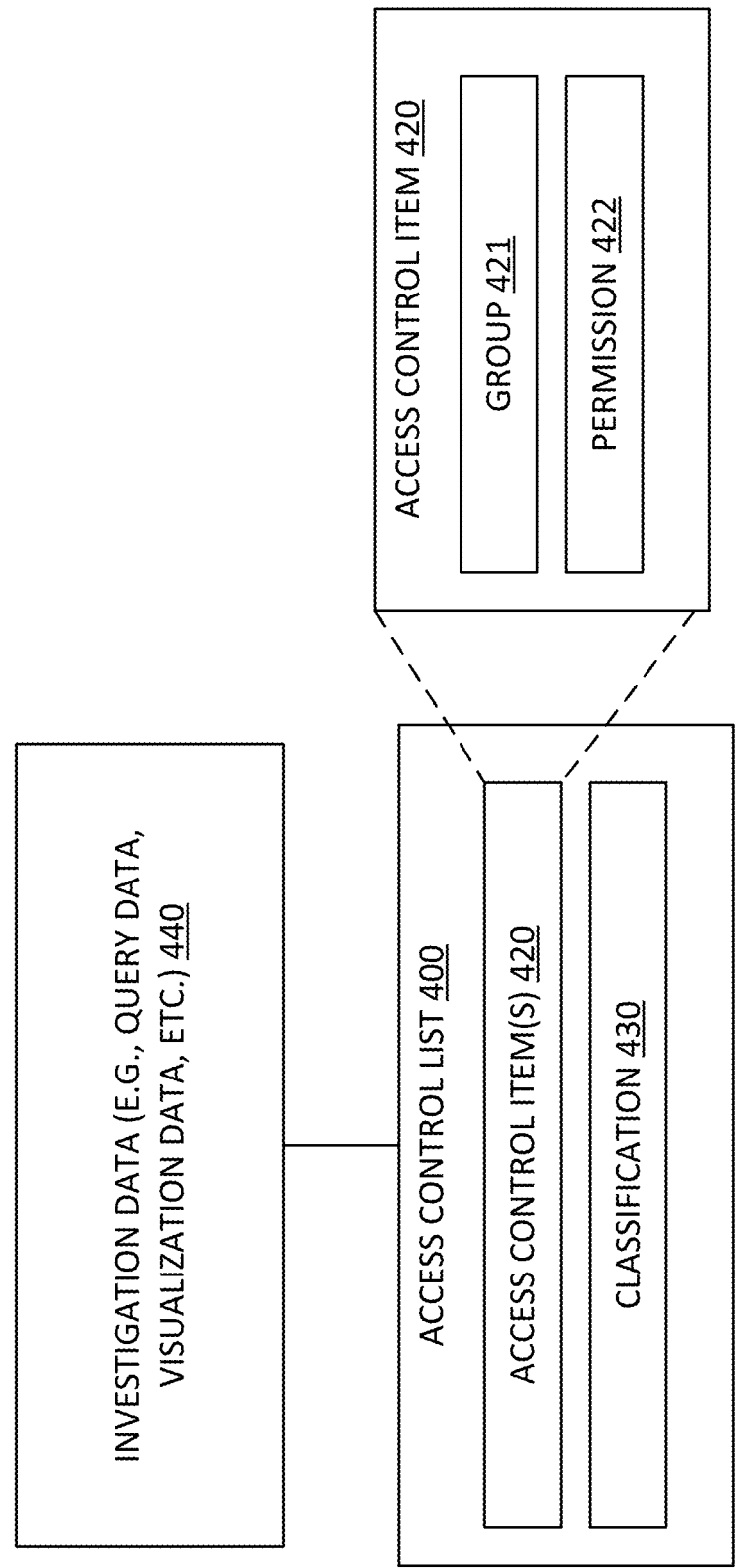
FIG. 4 is a block diagram illustrating an example access control list for investigation data, according to some embodiments of the present disclosure.

FIG. 4 is a block diagram illustrating an example access control list for investigation data, according to some embodiments of the present disclosure. In some embodiments, the query system 100 uses access control lists to allow a user to specify which other users and/or teams are permitted to view investigation data, which may correspond to data structures for respective investigations. Additionally or alternatively, access control lists may further specify the permissions of particular users to view and/or modify view investigation. Access control environment 490 includes investigation data 440 and access control list 400. In some embodiments, access control list 400 is stored in a data store and/or data source of the query system 100. Example access control list 400 includes one or more access control items 420 and zero or more classifications 430. Example access control list 400 is associated with one or more investigation data, such as the investigation data 440. Thus, example access control list 400 of the query system 100 provides a level of granularity to specify sharing rules and/or permissions on a per-data item basis. For example, during the creation and/or editing of investigations, a user may specify a group corresponding to the investigation. Accordingly, the users belonging to that group may view and/or edit the investigation.

Example access control item 430 includes group 421 and permission 422. Example group 421 identifies a set of users and/or teams. Example permission 422 identifies an operation that a user in the set can perform on investigation data 440. Additionally or alternatively, example permission 422 further identifies an operation the user in the set can perform on access control list 400. Non-limiting examples of permission 422 include read, write, owner, create, delete, read only, and/or some combination thereof.

In some embodiments, if access control list 400 has a classification 430, then a user must be authorized for the classification 430. Thus, classification 430 may override permission 422 granted to the entity and/or user. For example, one possible set of classification markings as part of classification 430 include "Top Secret," "Secret," "Confidential," "Restricted," "For Official Use Only," among others, while another example classification scheme may use the markings: "Public" and "Restricted," among others. For example, the permissions of an access control list may indicate that a particular data object should not be shared with particular users. The example data structures of FIG. 4 may correspond to the sharing and/or editing capabilities of the query system 100, as described herein. For example, user interfaces for sharing investigations that may be edited by others and/or team are described in further detail with respect to FIG. 8B.

Additionally or alternatively, "sharing" an investigation may correspond to sending investigation data to another user and/or recipient. For example, the one or more options and/or associated panel data for the shared investigation may be sent to the user, and if the user makes any modifications, then the investigation may be persisted to their set of investigations. For example, user interfaces for sharing investigations that may be persisted for each user described in further detail with respect to FIG. 8A. In some embodiments, an investigation may dynamically retrieve data from one or more data sources. Accordingly, by "sharing" an investigation, upon receiving the investigation the query system 100 may execute one or more associated queries to dynamically present the visualization data. Alternatively, the query system 100 may persist the results and/or visualization data for a shared investigation, such that the receiving user may view historic results and/or visualization data. The user interface may provide the user with the ability to refresh their investigation and/or panels with current data.

Example User Interfaces

FIGS. 5A-5N, 6A-6E, and 7 illustrate example user interfaces of the query system 100, according to some embodiments of the present disclosure. In various embodiments, aspects of the user interfaces may be rearranged from what is shown and described below, and/or particular aspects may or may not be included. However, the embodiments described below in reference to FIGS. 5A-5N, 6A-6E, and 7 provide example user interfaces of the query system 100. The user interfaces of FIGS. 5A-5N, 6A-6E, and 7, such as, user interfaces 500, 600, and 700, respectively, may have similar user interface elements and/or capabilities.

Figure 5A:
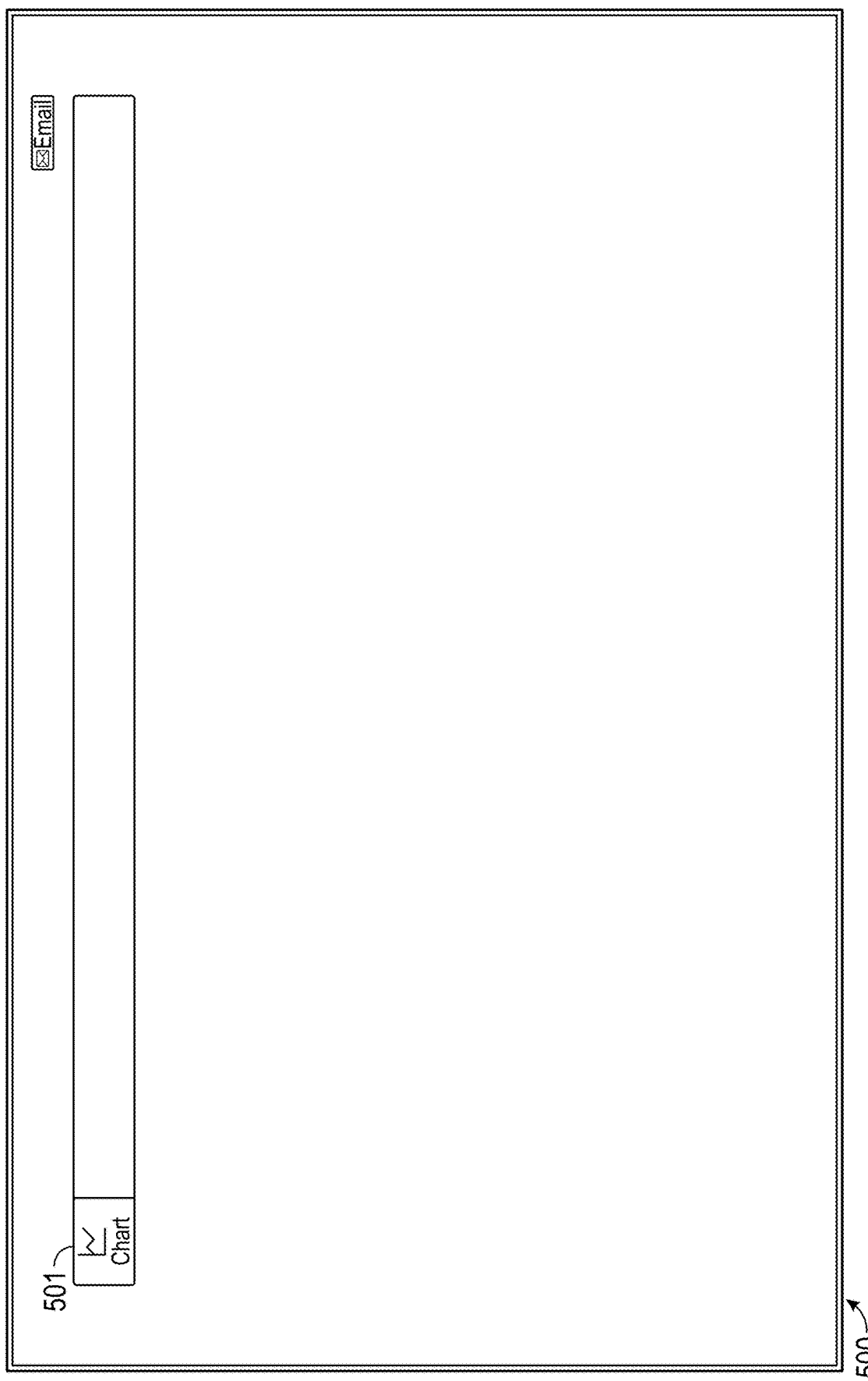
Figure 5B:
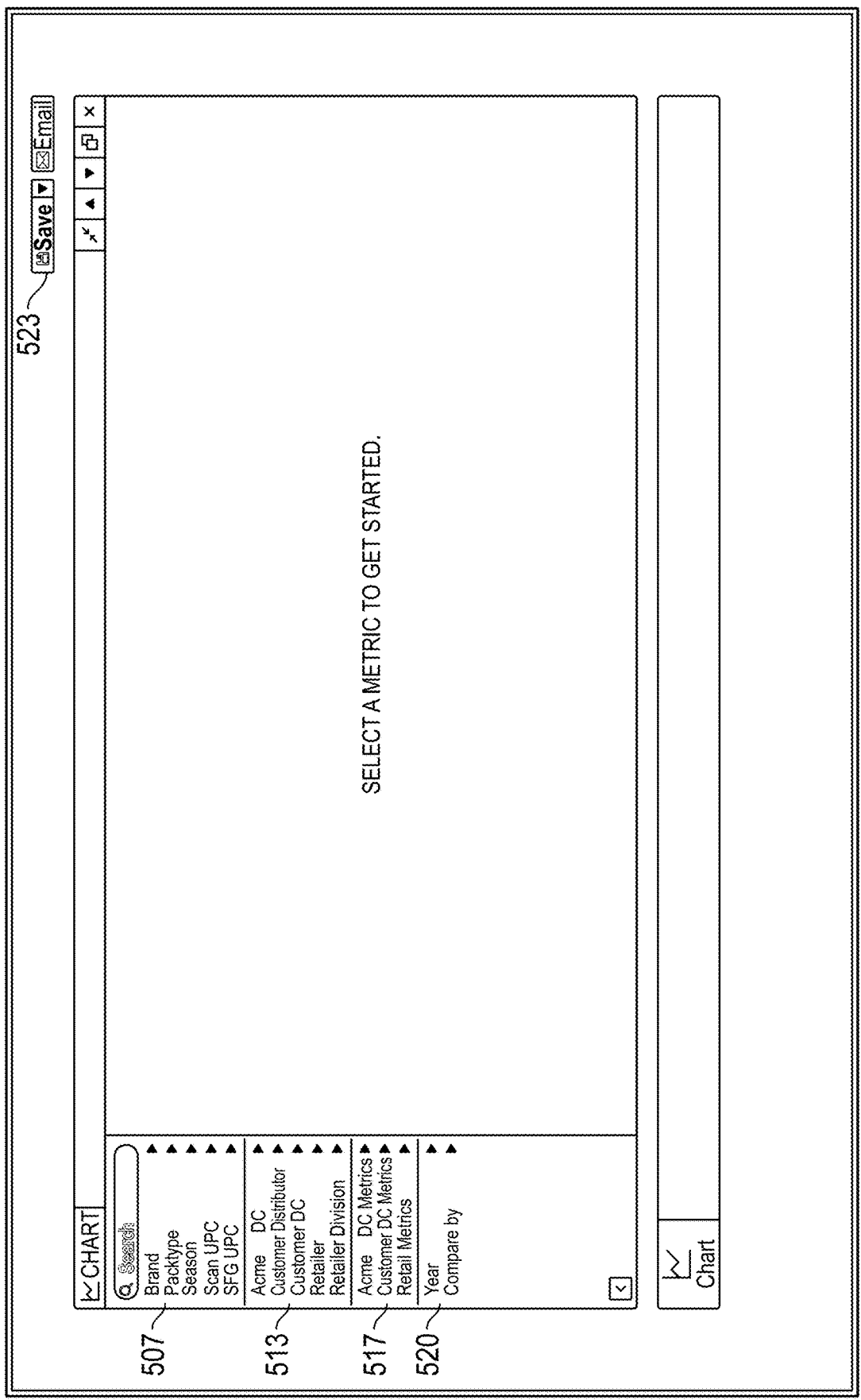
Figure 5C:
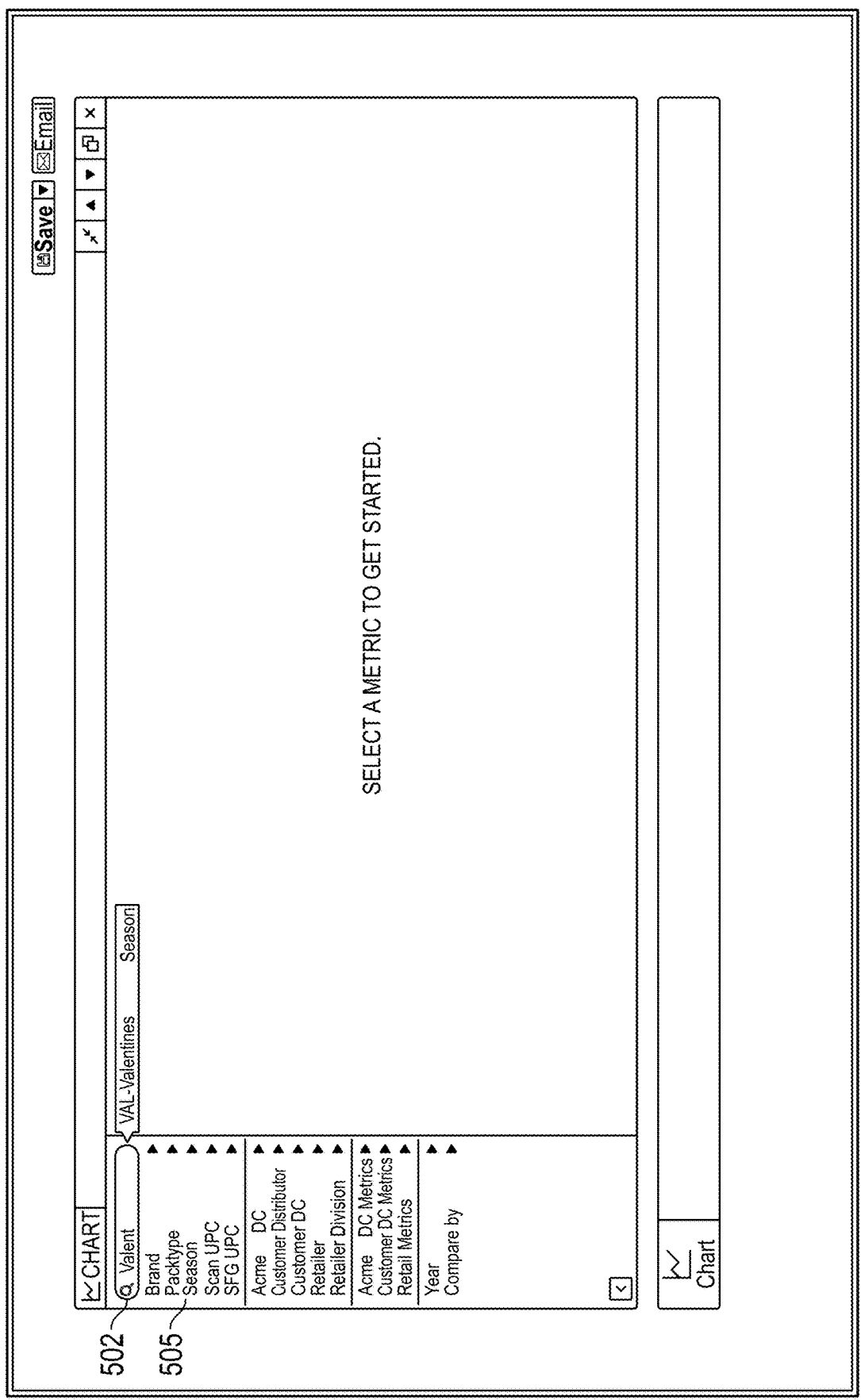
Figure 5E:
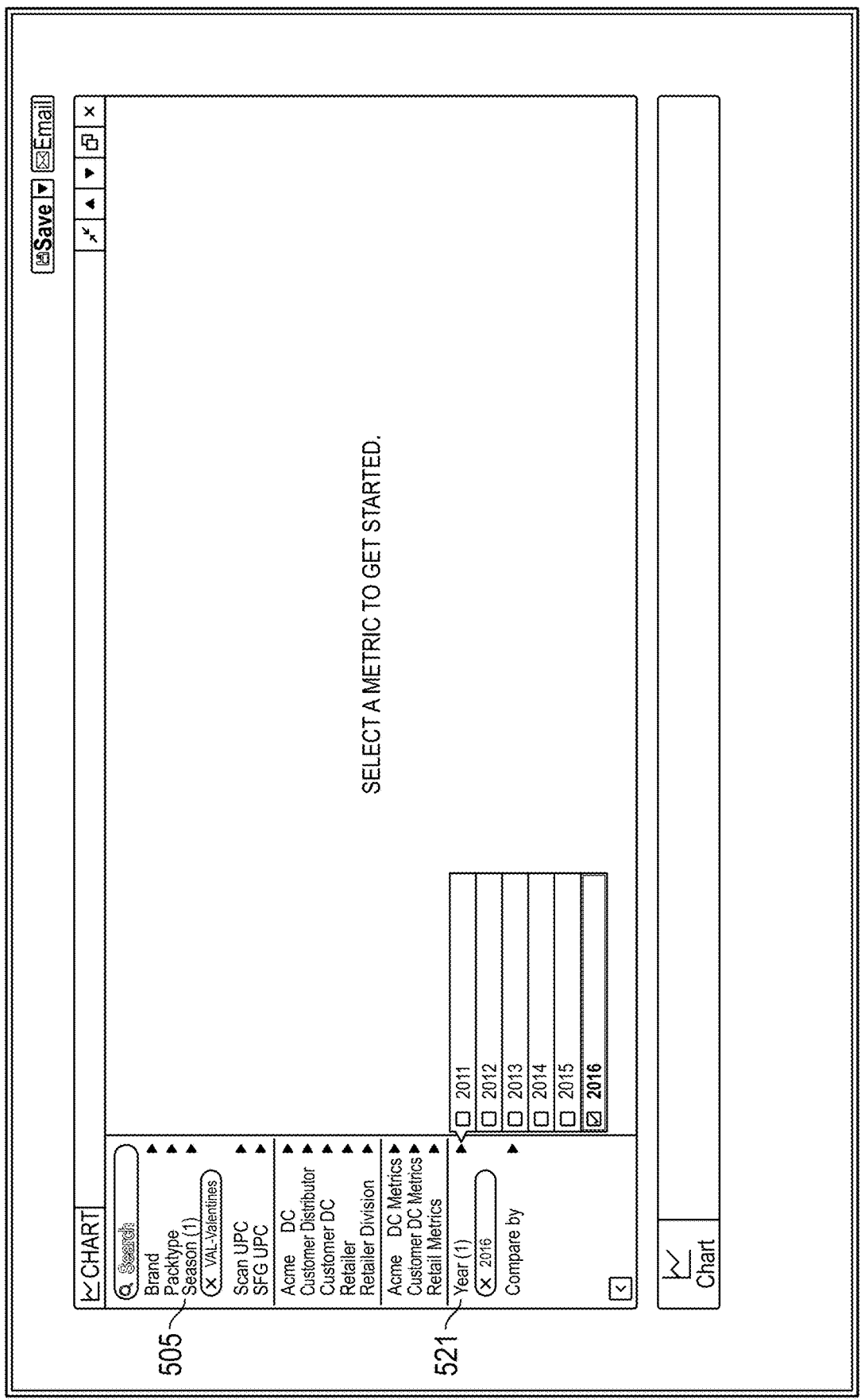
Figure 5F:
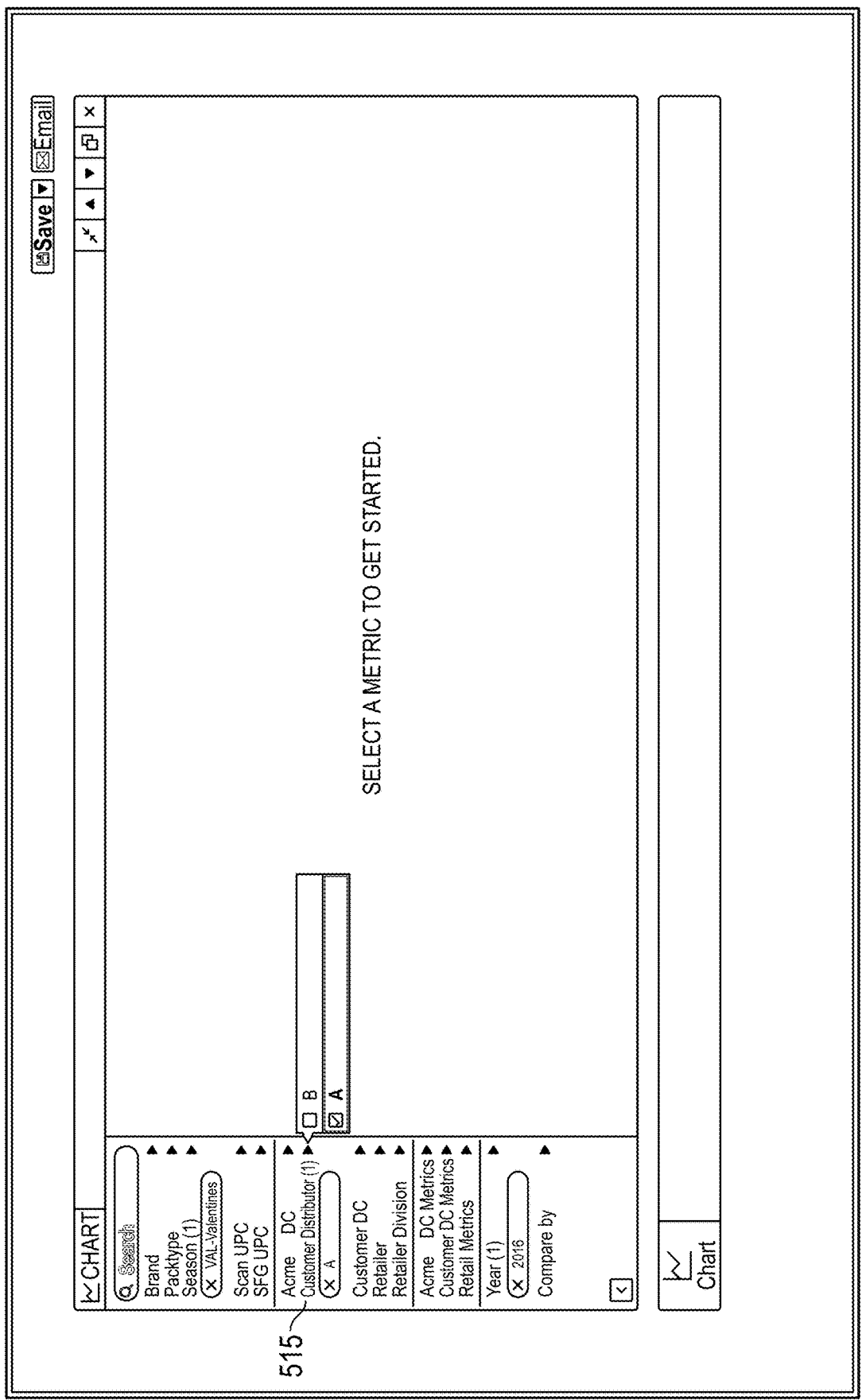
Figure 5G:
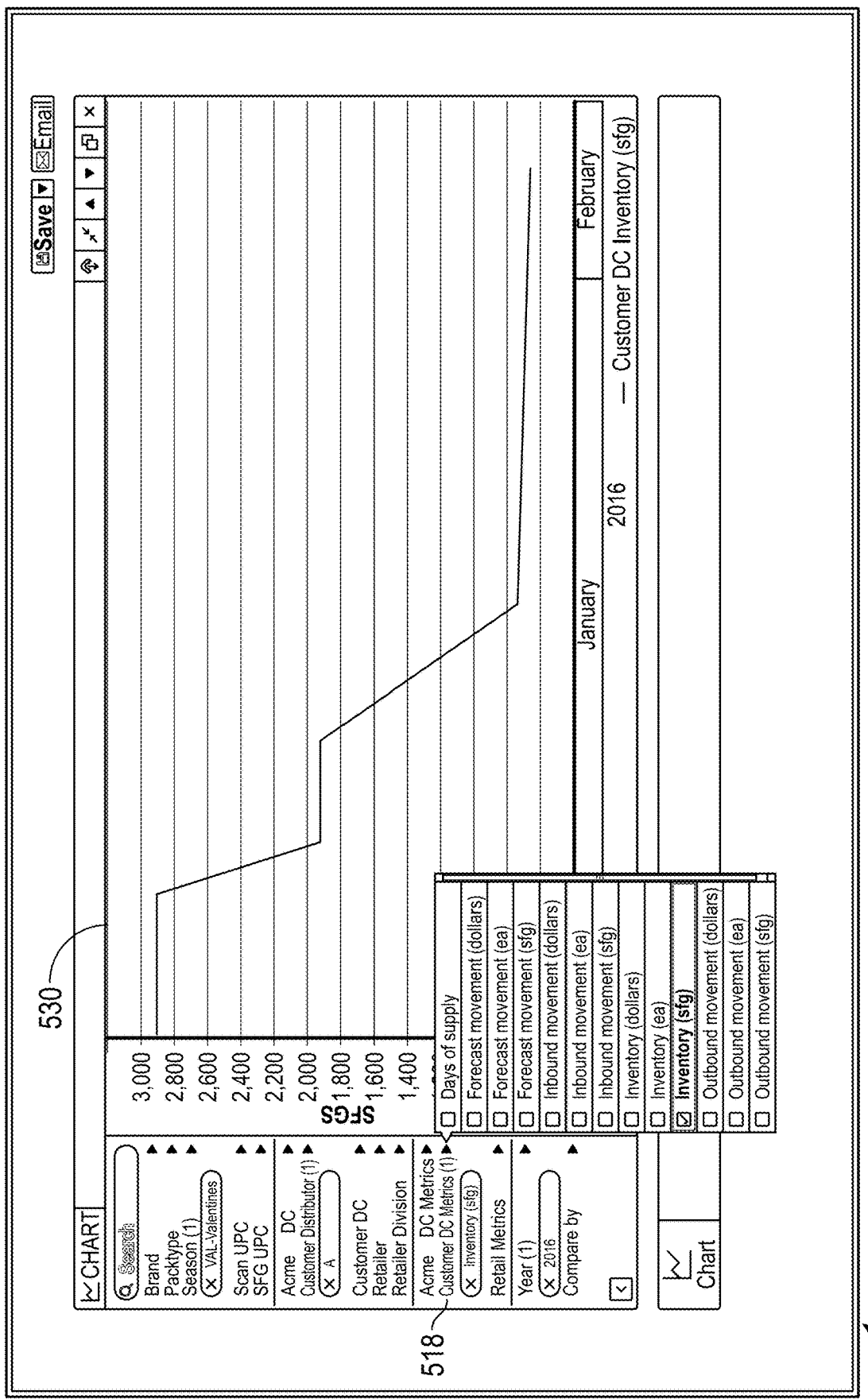
Figure 5H:
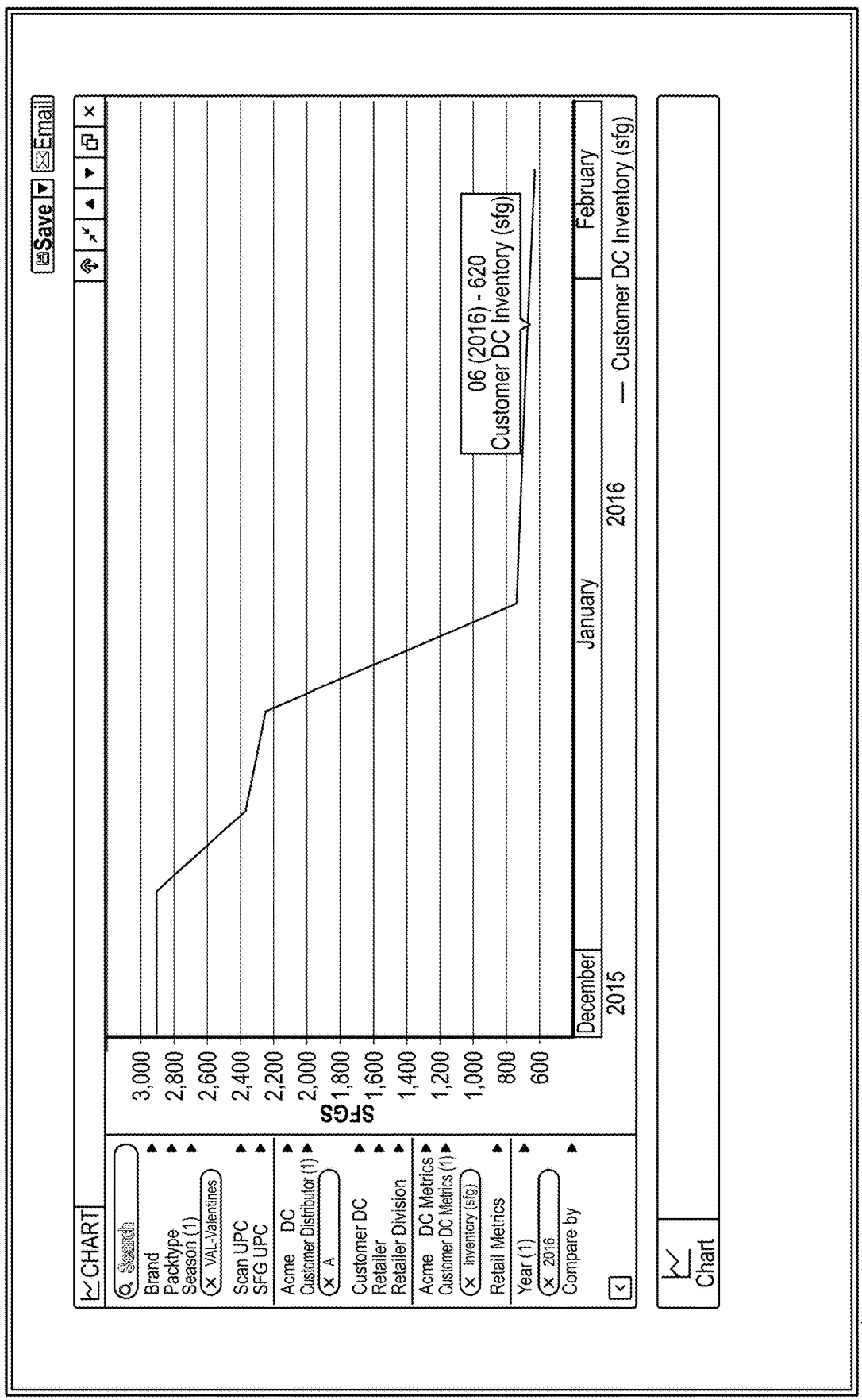
Figure 5I:
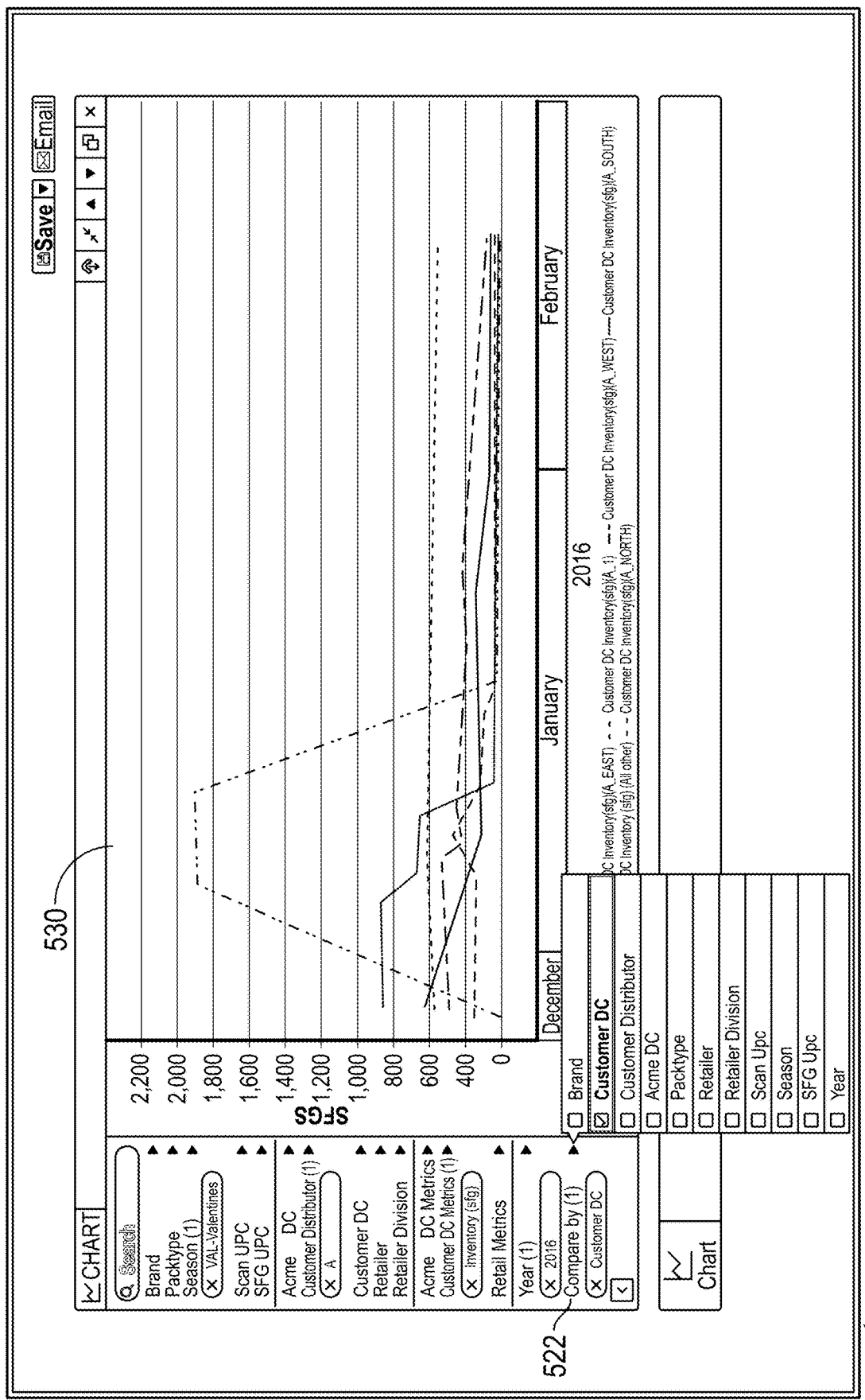
Figure 5J:
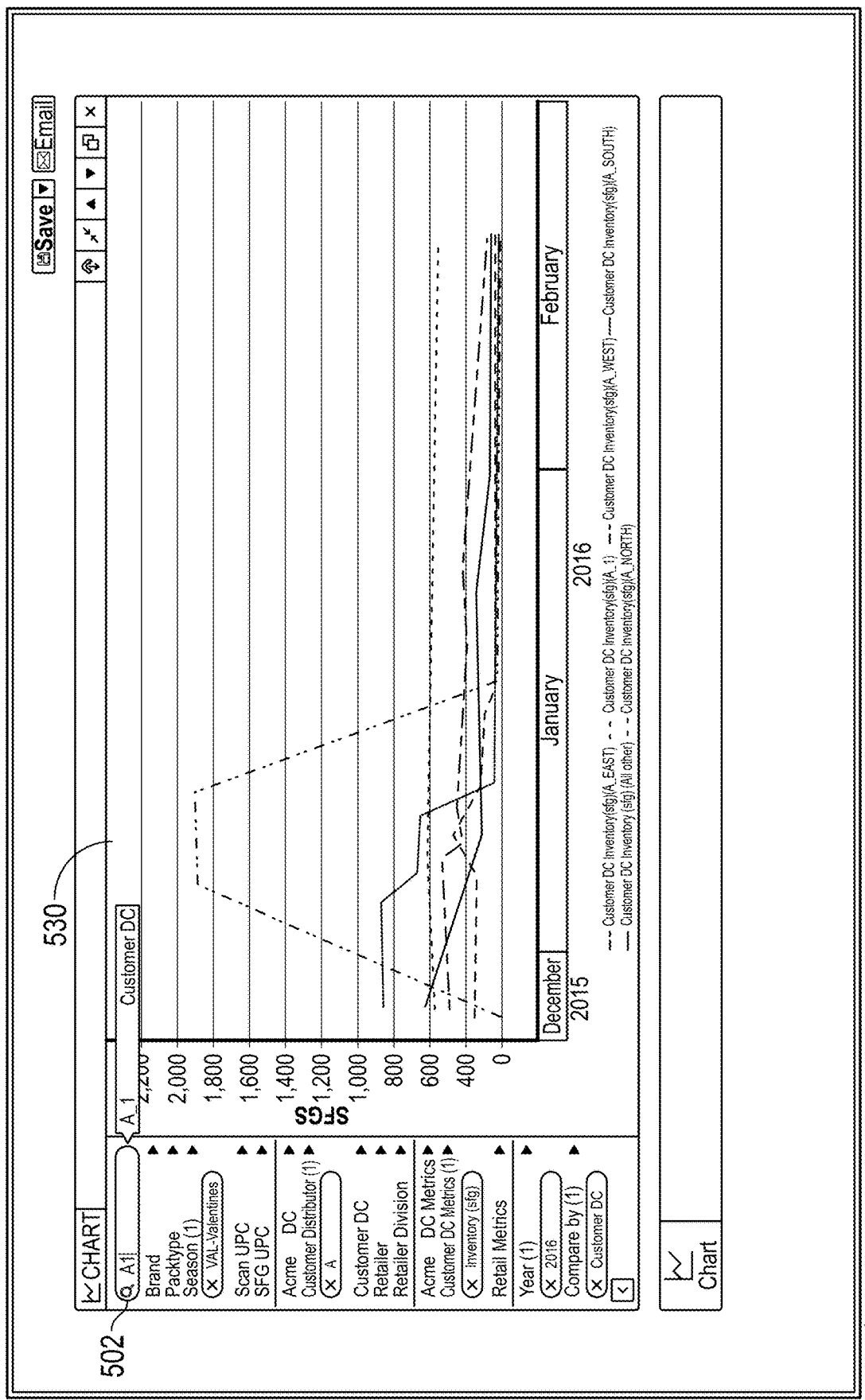
Figure 5K:
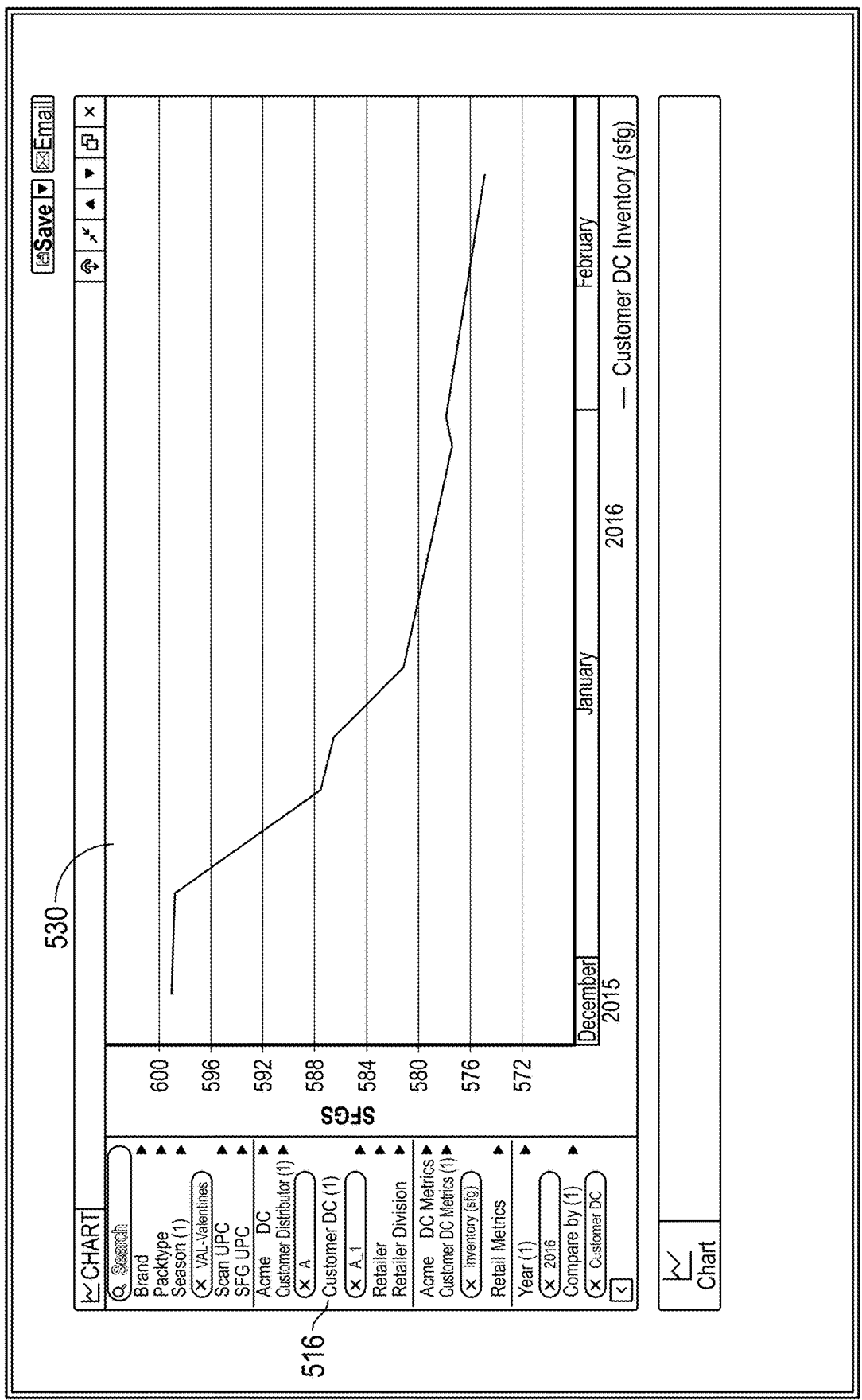
Figure 5L:
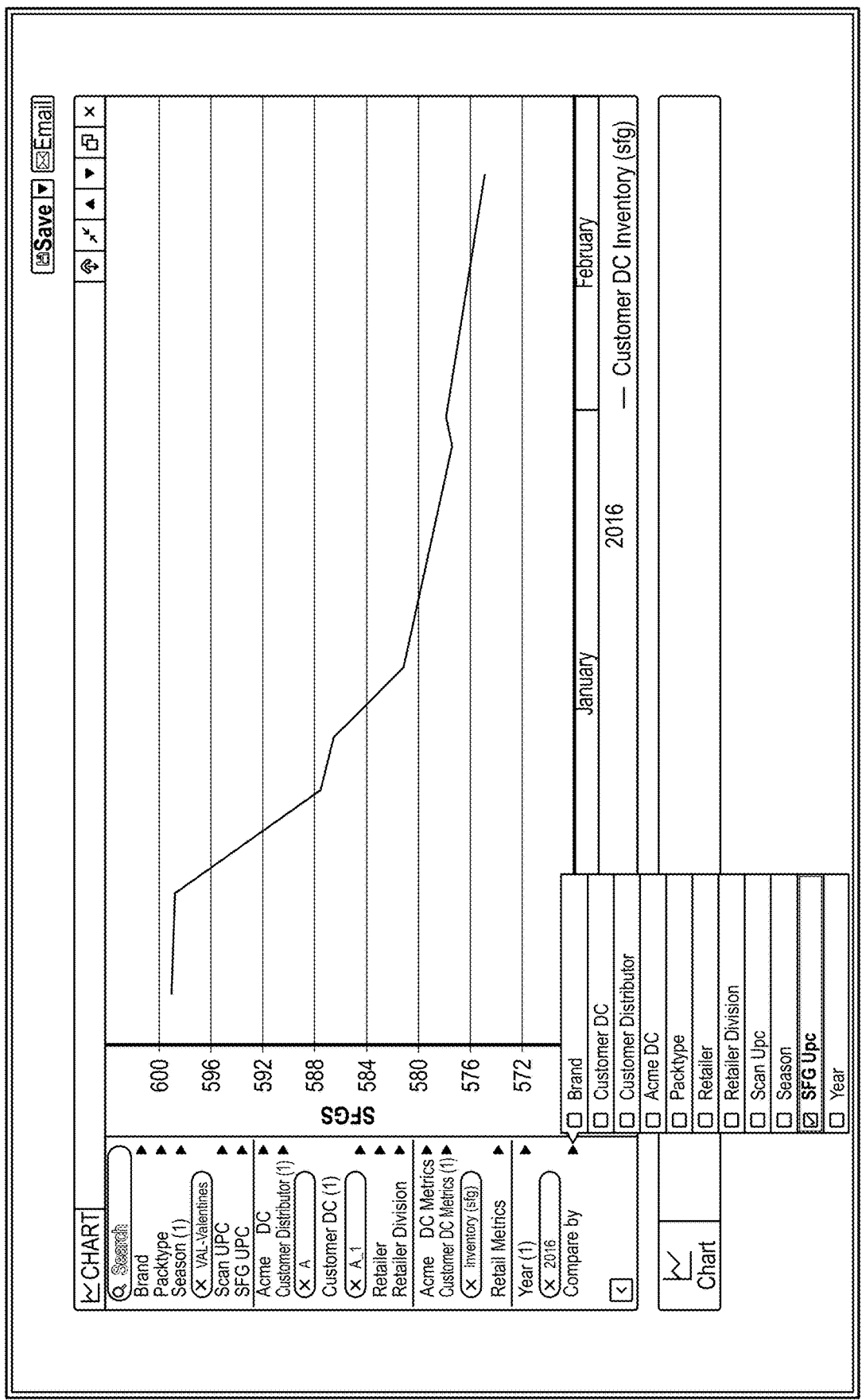
Figure 5M:
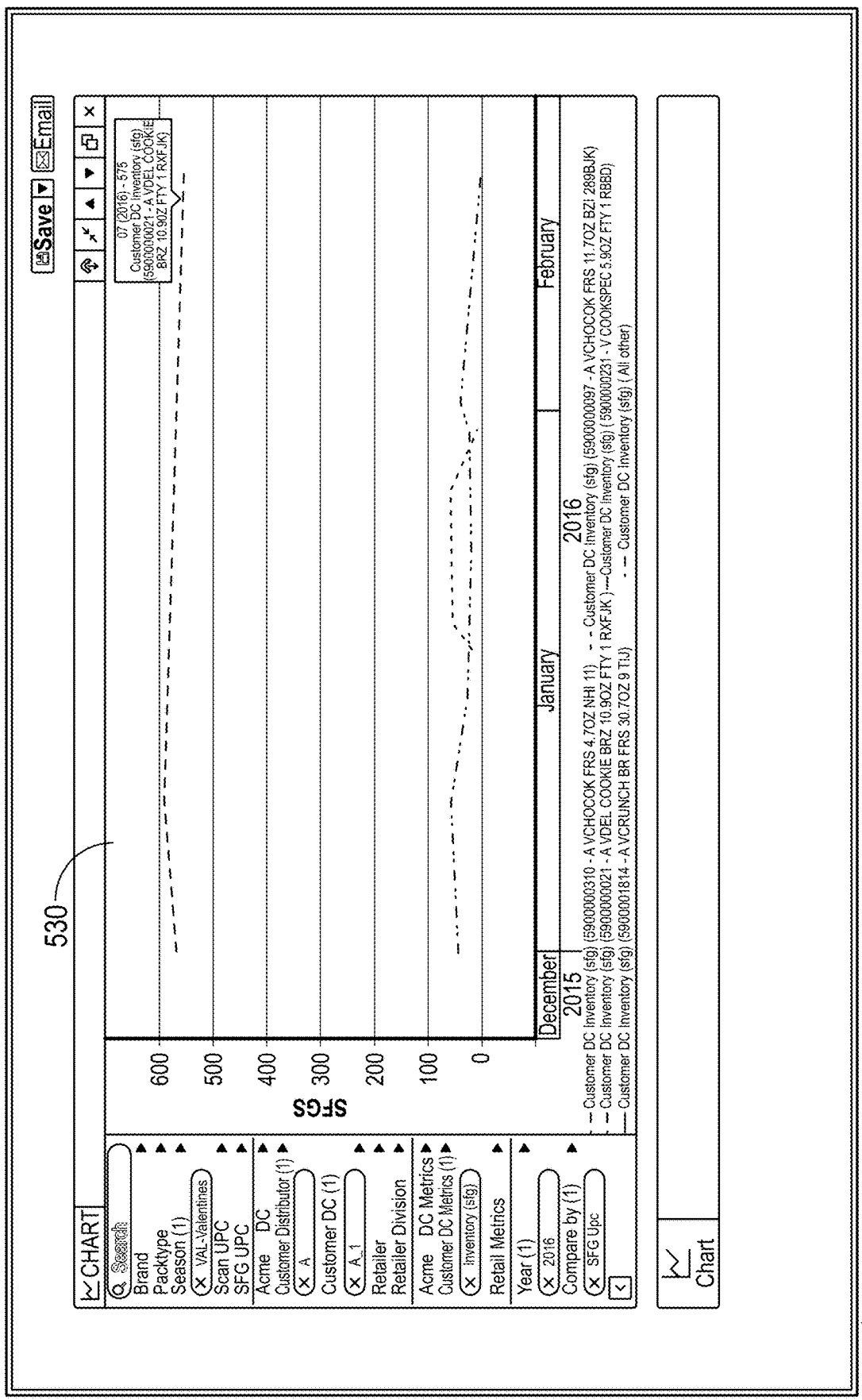
Figure 5N:
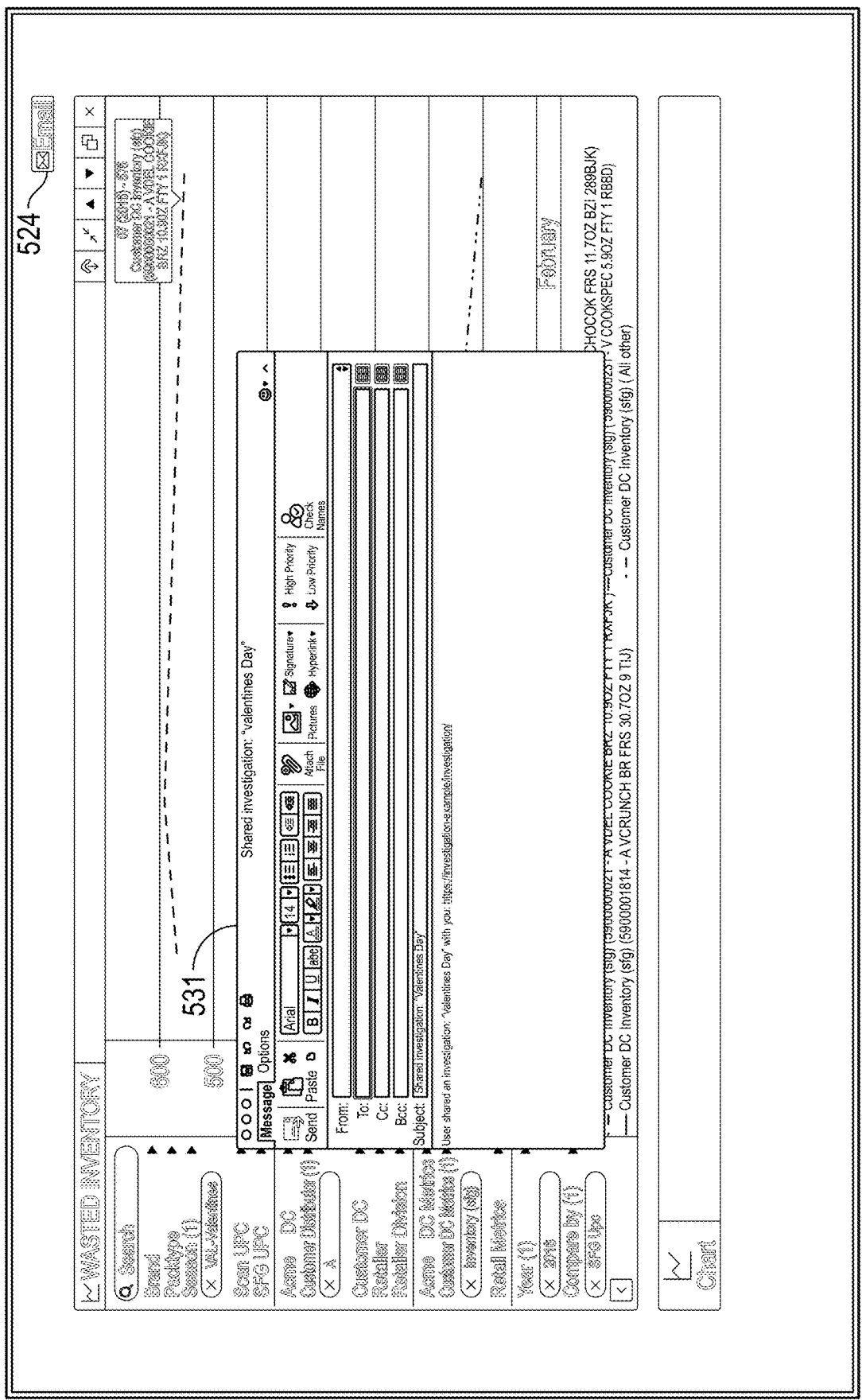

FIGS. 5A-5N illustrate example user interface 500 of the query system 100 that enables a user to investigate and/or view integrated data sets of items, attributes, categories, entities, statistics, and/or other data. Functional aspects of the example user interface 500 may correspond to the method 200 of FIG. 2 and/or the method 300 of FIG. 3.

FIGS. 5A-5B illustrate how a new panel may be added to the example user interface 500. For example, user selection of the chart selector 501 may cause the user interface options to be shown in the example user interface 500 of FIG. 5B. In FIG. 5B, user interface 500 includes an item input area 507, an entity input area 513, a statistical measure input area 517, and a miscellaneous filter area 520. In some embodiments, if there is a user interaction with the user interface 500, such as an update to the current investigation, user interface 500 presents a persist option 523 to the user to persist state associated with the user interface 500. For example, the currently selected user interface options may be persisted and/or other state associated with the user interface 500 may be persisted.

FIGS. 5C-5F illustrate example user interface selections of user interface 500. In FIG. 5C, user input within the search area 502 may cause a text auto complete feature for selectable options within the user interface 500. As illustrated, user input of "Valent" may cause the user interface 500 to present the "VAL-Valentines Season" option for selection by a user. The "VAL-Valentines Season" option illustrates a selectable option from the season attribute selector 505. In FIG. 5D, the "VAL-Valentines" option from the season attribute selector 505 of the user interface 500 has been selected. FIG. 5D also illustrates additional or alternative selectable options of the season attribute selector 505. As illustrated, a user may select multiple of the user options for the same selector, such as multiple season options from the season attribute selector 505. In FIG. 5E, the 2016 year option of the user interface 500 has been selected from the year selector 521. As illustrated in FIG. 5E and as described herein, user interface selections may be cumulative. For example, the user interface 500 of FIG. 5E illustrates selection of an option from the season attribute selector 505 and from the year selector 521. In FIG. 5F, the "A" option from the entity distributor selector 515 of the user interface 500 has been selected. The example "A" option represents an A entity that has been selected as input for a respective query. As illustrated, the example query system 100 is still unable to present results in the user interface 500 until a statistical measure and/or "metric" has been selected.

FIG. 5G illustrates a user interface selection of a statistical measure and presentation of a visualization within the user interface 500. The "Inventory (sfg)" option from the entity distributor metric selector 518 of the user interface 500 has been selected. The "Inventory (sfg)" option, where "sfg" or "sfgs" is also known as saleable finished goods or "cases," is an example statistical measure input. The statistical measure input may include a user selection of a statistical measure of statistical related information. Accordingly, the user interface 500 dynamically presents the results of one or more queries within the visualization area 530. The example visualization is a graph. In some embodiments, the visualizations may include time series graphs, as illustrated.

FIG. 5H illustrates results and/or a visualization presented in the user interface 500. In particular, the example graph of FIG. 5H represents multiple different inventory items associated with the season Valentines or Valentine's Day and further associated with the entity distributor A for the year 2016. As illustrated, the Valentine's Day inventory peaks at approximately 3,000 units before mid-January, drops below 800 units after mid-January, and to 620 units towards the end of January. As used herein, the unit values in the user interface 500 are illustrative and/or notional. Similarly, aspects of the user interfaces such as user selections, representations of graph lines, and/or some combination thereof are illustrative. For example, the units represented on the y-axis of each of FIGS. 5G-5M and 6A-6E may not be entirely consistent with one another from figure to figure. The results and/or visualization may indicate to a user the accumulation of inventory at upstream entity distribution centers leading up to the Valentine's Day holiday and the increase of inventory as the holiday approaches up to a certain date. However, an analyst viewing the results may be concerned that the inventory does not actually go completely to or near zero units. In other words, excess inventory after a holiday may be a cause for concern or further investigation. Additionally or alternatively, the query system 100 may present panels and/or dashboards for a user to review in a more passive manner, which may differ than the active user interface investigations described herein. Accordingly, the user interface 500 causes one or more queries to be generated and executed to retrieve the results presented in the user interface 500. Moreover, the user interfaces provided herein may free the user from having to know about the underlying data structures in the data source in detail, such as specific tables, or about the underlying query language, such as SQL, to investigate integrated data sets and/or view summaries of integrated data sets.

FIG. 5I illustrates further filtering of the results and/or visualization presented in the user interface 500. The "Customer DC" and/or entity distribution center option from the compare by selector 522 of the user interface 500 has been selected. Accordingly, the user interface 500 dynamically presents new results of additional one or more queries within the visualization area 530.

FIG. 5J illustrates updated results and/or an updated visualization presented in the user interface 500. In addition to the criteria specified in FIGS. 5B-5I, the example graph of FIG. 5J illustrates the "compare by" user interface option to further group the results. In the example, the inventory results are grouped by the top five highest inventory entity distribution centers: "A_1," "A_EAST," "A_SOUTH," "A_NORTH," and "A_WEST," which may represent individual distribution centers and/or entity locations. The "All other" category may represent multiple entity locations as aggregated together and/or the remaining entity locations as aggregated together. In the example, the analyst may be interested in the graph line for the A_1 entity, and as illustrated the analyst may input "A_1" into the search area 502. Continuing with the example, the analyst may be interested in investigating the A_1 entity because the graph line corresponding to the entity "A_1" within visualization area 530 may be a substantial number of units through February that indicates the A_1 entity may be a significant contributor to the excess inventory. As illustrated, the number of units corresponding to the entity "A_1" may be approximately less than 600 units through February.

FIG. 5K illustrates additional filtering of the results and/or an updated visualization presented in the user interface 500. For example, the graph within visualization area 530 presents the inventory results for the entity distribution center A_1 as indicated by the selection of the entity distribution center selector, which corresponds to the user input illustrated in FIG. 5J. As previously mentioned, the graphs and/or visualizations of the Figures may be illustrative, and the graph line of FIG. 5J may not exactly match up with the graph lines of previous user interfaces, such as the user interface of FIG. 5J.

FIGS. 5L-5M illustrates further filtering of the results and/or an updated visualization presented in the user interface 500. In FIG. 5L, the "SFG Upc" and/or saleable finished goods item UPC option from the compare by selector 521 of the user interface 500 has been selected. Accordingly, in FIG. 5M, the user interface 500 dynamically presents new results of additional one or more queries within the visualization area 530. As illustrated, yet again, the selection of the "compare by" user interface option causes the user interface 500 to present the results in groupings. In the example, the inventory results are grouped by the top five highest item groupings (here "SFG Upc" and/or saleable finished goods UPC): "A VCHOCOK FRS 4.7 OZ . . . ," "A VCHOCOK FRS 11.7 OZ . . . ," "A VDEL COOKIE . . . ," "V COOKSPEC . . . ," and "A VCRUNCH . . . ," which may represent individual items such as saleable finished goods UPCs. The "All other" category may represent items as aggregated together and/or the remaining items as aggregated together. In the example, the analyst may be interested in the graph line for the "A VDEL COOKIE . . . " item because the graph line may be approximately 600 units through February that indicates that the "A VDEL COOKIE . . . " item may be a significant contributor to the excess inventory. Accordingly, the analyst may act on this information to optimize the distribution process and/or reduce excess inventory in the future.

FIG. 5N illustrates sharing of an investigation. The example user interface 500 includes an "Email" and/or share option 524. Accordingly, user selection of the share option 524 causes presentation of the share dialog 531. As illustrated, one mechanism of sharing may be an electronic communication and the share dialog 531 may enable a user to compose an electronic communication to share the current investigation. In some embodiments, the electronic communication may include a URI. The example URI may include a unique identifier (not illustrated), such as a GUID and/or hash, that identifies the particular investigation.

FIGS. 6A-6E illustrate example user interface 600 of the query system 100 that provides various options for a user to investigate and/or view integrated data sets of items, attributes, categories, entities, statistics, and/or other data. For example, the user may duplicate panels, interact with multiple panels, and/or interact with one or more panels to create an audit trail. Functional aspects of the example user interface 600 may correspond to the method 200 of FIG. 2 and/or the method 300 of FIG. 3. The user interfaces of FIGS. 5A-5N and 6A-6E such as, user interfaces 500 and 600, respectively, may have similar user interface elements and/or capabilities.

Figure 6A:
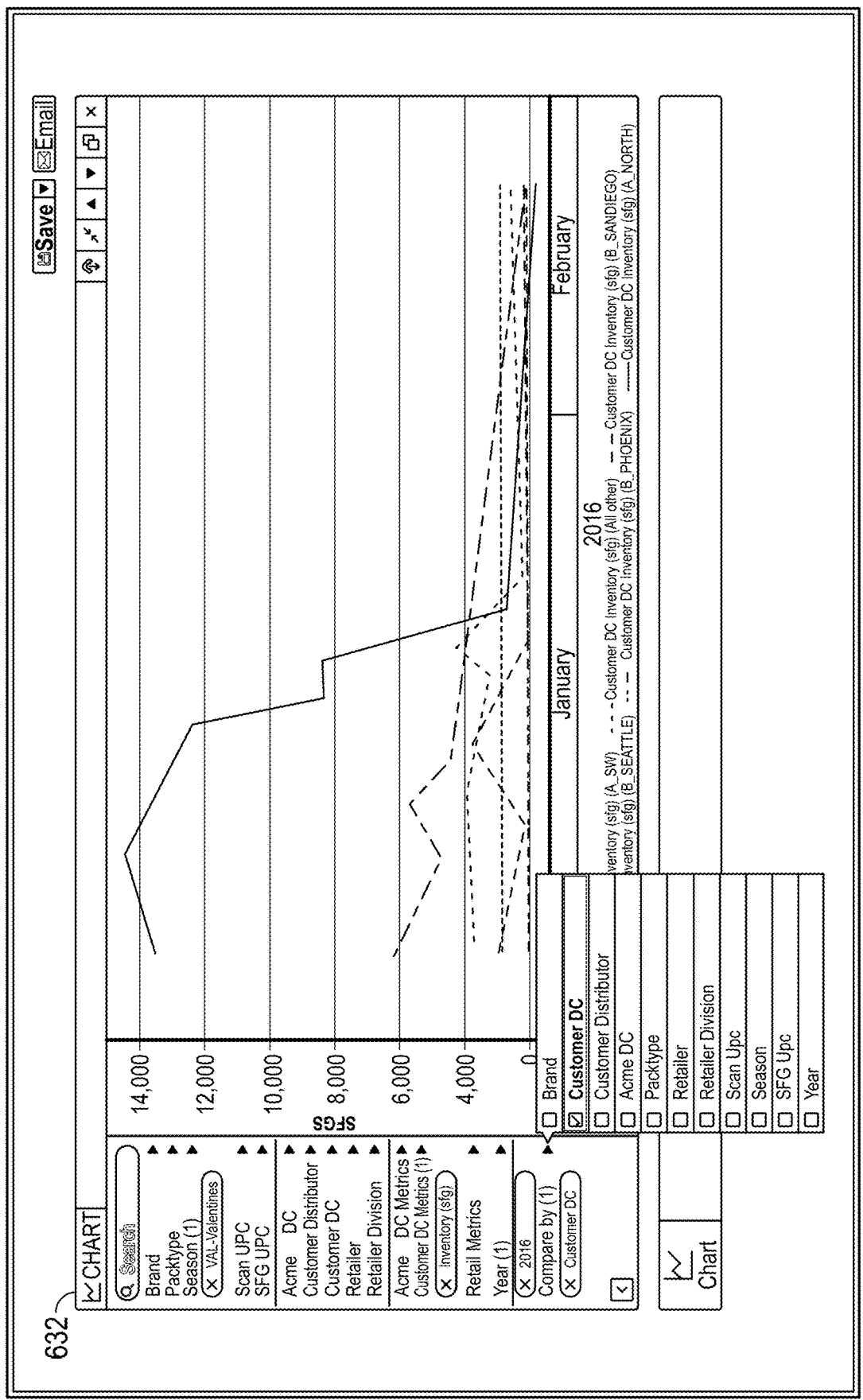

FIG. 6A illustrates additional user interface selections and the corresponding visualization within the user interface 600. Similar to the user interface selections and/or visualizations of FIGS. 5C-5M, the user interface 600 represents example user interface selections of: Valentine's Day season, inventory statistics for saleable finished goods, for the year 2016, and grouped by entity distribution center. As illustrated, the example graph of the panel 632 presents inventory for a predefined number of highest inventory entities, here five entities: B_SANDIEGO, B_SEATTLE, B_PHOENIX, A_SW, and A_NORTH. Unlike the example visualizations of FIGS. 5F-5N that were limited to the entity "A," the visualization and corresponding one or more queries of the panel 632 include at least two entities: A and B.

Figure 6B:
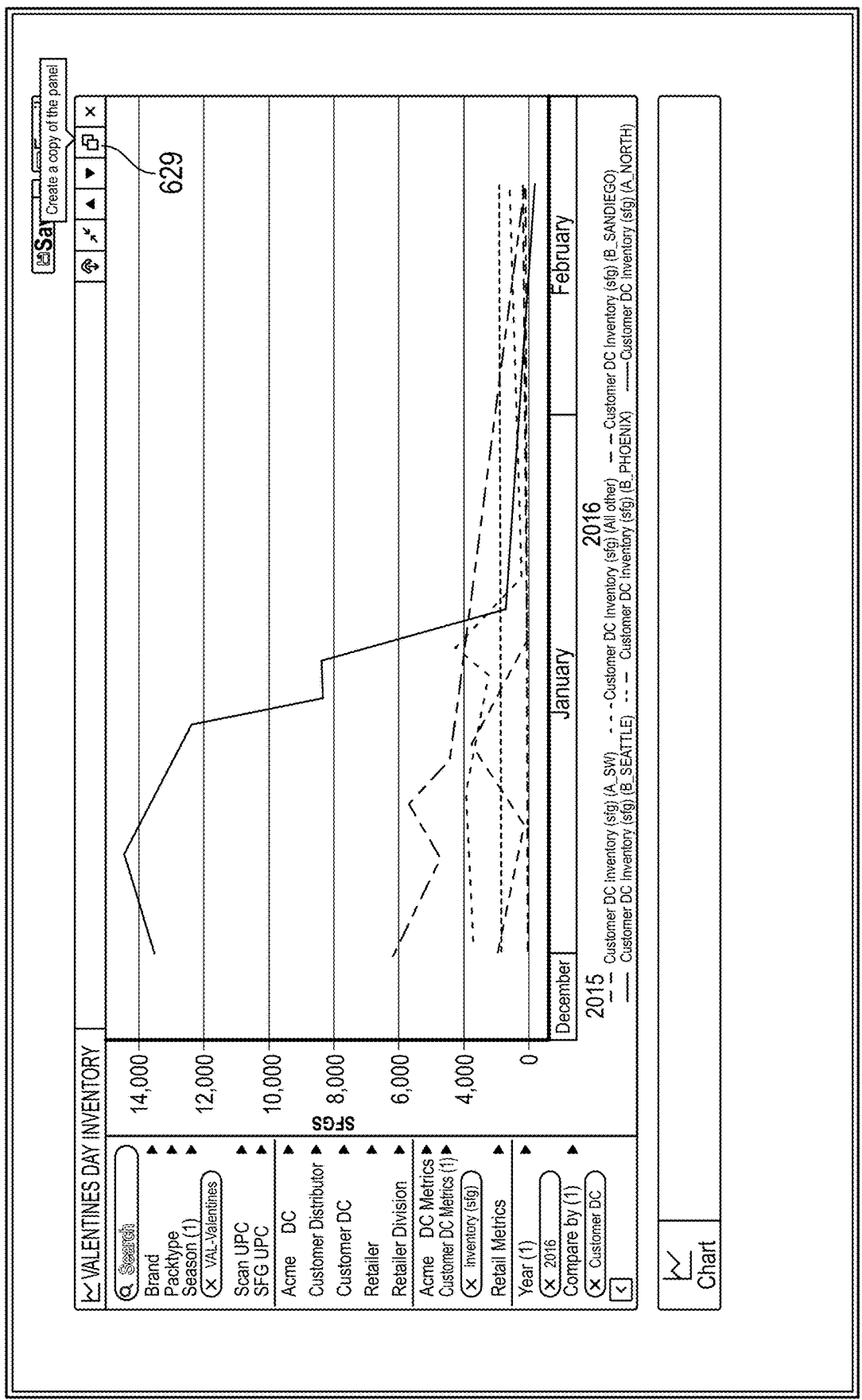
Figure 6C:
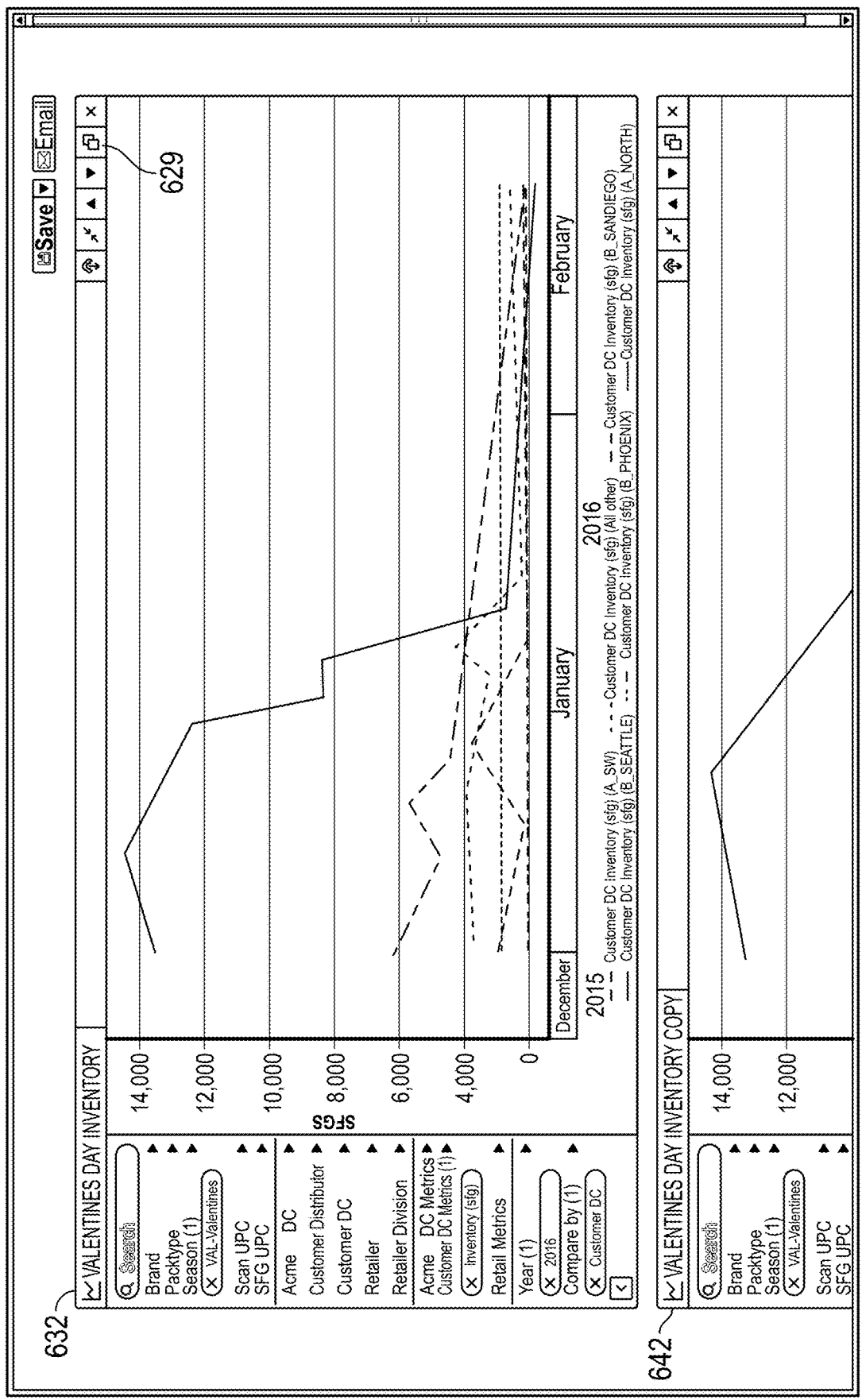

FIGS. 6B-6C illustrate the duplication option of user interface 600. For example, user selection of the duplication option 629 from the panel 632 of FIG. 6B may cause, as illustrated in FIG. 6C, the presentation of a duplicate panel 642 that was copied from the panel 632.

Figure 6D:
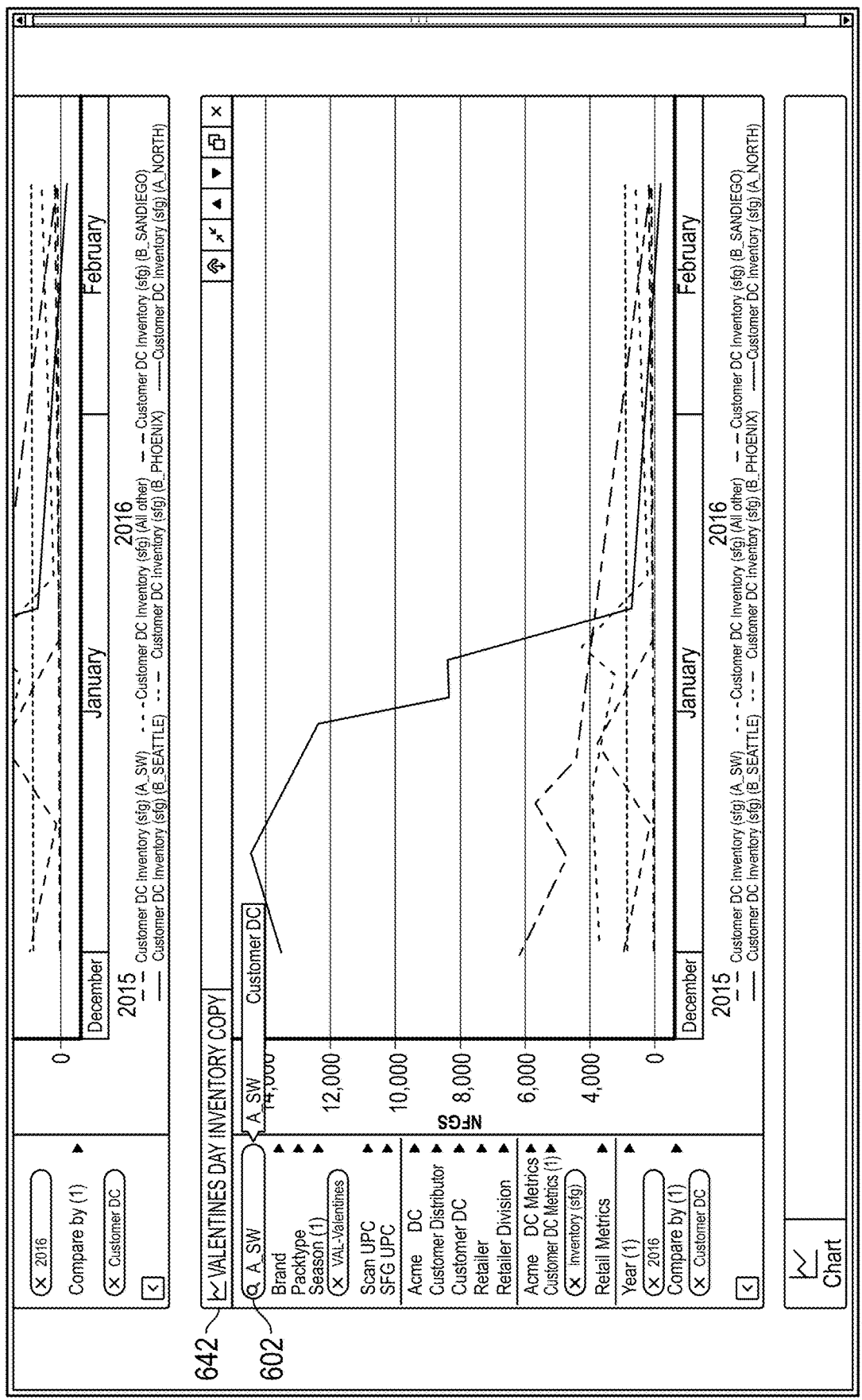
Figure 6E:
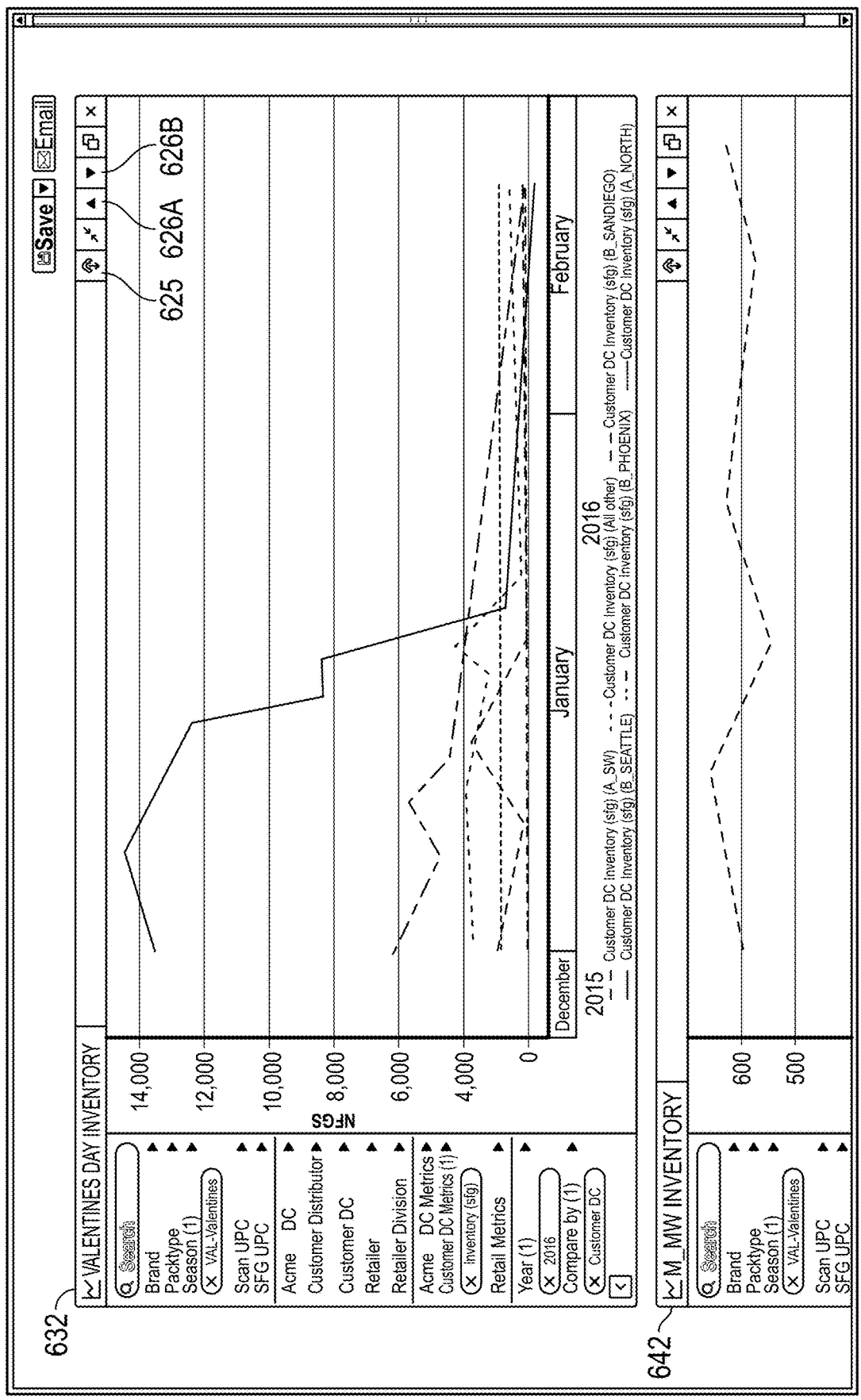

FIGS. 6D-6E illustrate that a user may interact with the duplicate panel, as described herein. For example, in FIG. 6D, user input within the search area 602 of the panel 642 may cause a text auto complete feature for selectable options within the panel 642. In the example, an analyst may be interested in the graph line for the A_SW entity, and as illustrated the analyst may input "A_SW" into the search area 602 of the panel 642. The panel 642 was duplicated from the panel 632; however, the panel 642 received different user interface selections than the user interface selections of the panel 632; therefore, as illustrated in FIG. 8E, the panel 642 may present a different visualization than the visualization of the panel 632.

In FIG. 6E, the user interface 600 includes various user interface options. For example, the panel 632 includes an export element 925 that causes the underlying data corresponding to the visualization of the panel 632 to be exported to a spreadsheet and/or delimited format such as a comma-separated values data format ("CSV"). The panel 632 includes navigation options 626A-626B that may cause the panel to move respective to other panels within the user interface 600. Other user interface options of user interface 600 include an option to make to panels be side-by-side within the user interface 600. As illustrated in FIG. 6E, a user may rename panels.

FIG. 7 illustrates the partial user interface 700 of the query system 100 that provides various interactive user interface options. Functional aspects of the example user 700 may correspond to the method 200 of FIG. 2. The partial user interface 700 of FIG. 7 may have similar user interface elements and/or capabilities of user interfaces 500 and 600 of FIGS. 5A-5N, 6A-6E, respectively. In FIG. 7, the entity user interface selector 702 may have been selected to the corresponding "GroceryPlus" option. Accordingly, the user interface 700 may update the available options within the user interface. For example, as illustrated, the entity division selector 704 may display user interface options associated with the previously selected option corresponding to the entity user interface selector 702. In the example, since the "GroceryPlus" entity option has been selected, the entity division selector 704 may filter and/or limit the options 706 to those divisions associated with the "GroceryPlus" entity. The configuration of the user interface 700 to have dependent and/or multi-dependent user interface options may be applied to the user interfaces described herein. As another example, in FIG. 7B, user selection of the "Customer Distributor" selector may cause the selectable "Customer DC" options to be limited to the particular "Customer Distributor" that has been selected. Accordingly, in some embodiments, any selection of a user interface option may update and/or cause other user interface options within the user interface to update such as narrowing or filtering the currently selectable options.

Figure 8A:
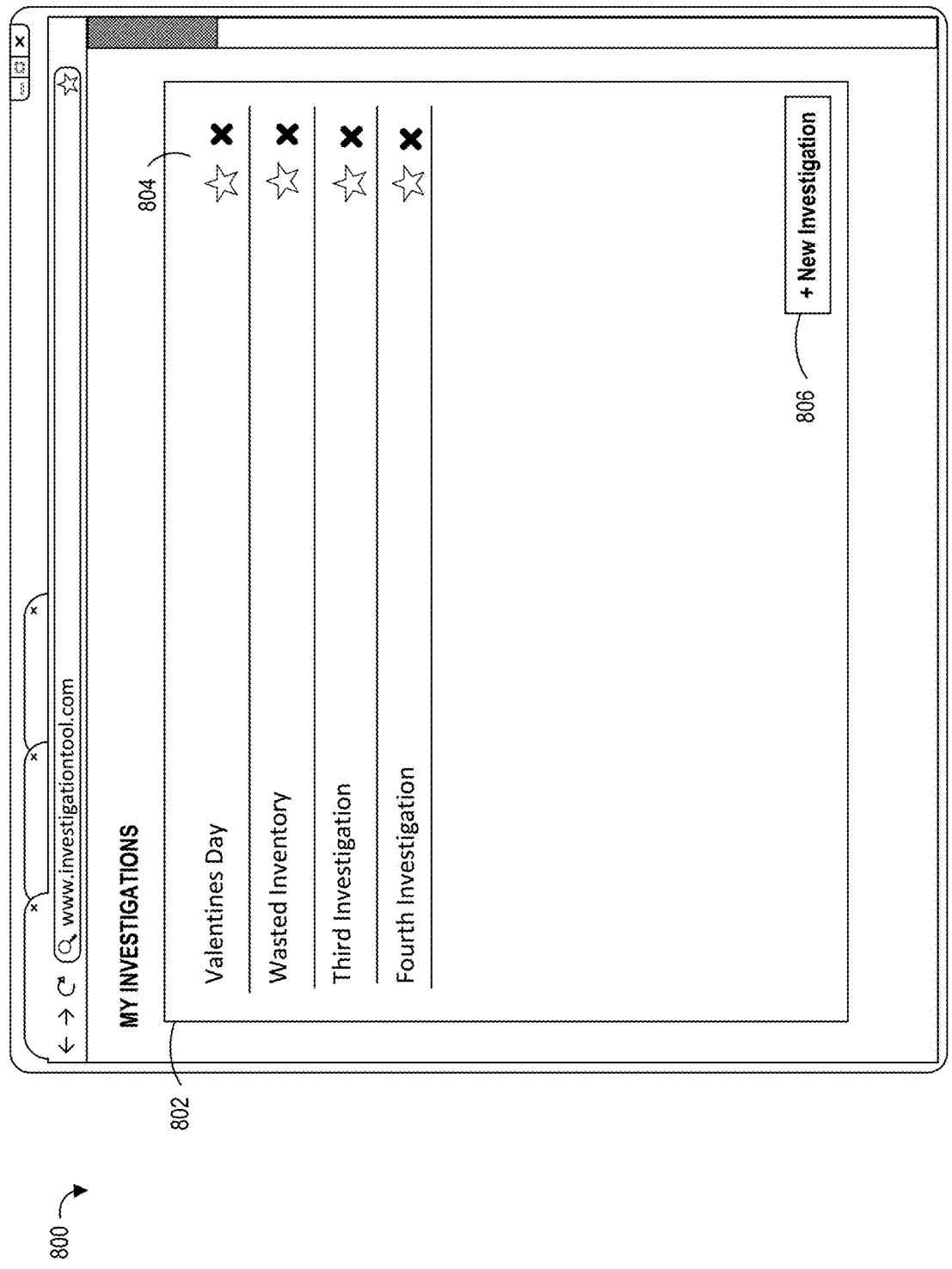

FIGS. 8A-8B illustrate example user interfaces of the query system 100, according to some embodiments of the present disclosure. In various embodiments, aspects of the user interfaces may be rearranged from what is shown and described below, and/or particular aspects may or may not be included. However, the embodiments described below in reference to FIGS. 8A-8B provide example user interfaces of the query system 100. The user interfaces of FIGS. 8A-8B, such as, user interfaces 800 and 850, respectively may have similar user interface elements and/or capabilities.

FIG. 8A illustrates an example home user interface of the query system 100. The example user interface 800 includes an investigation listing area 802, investigation controls 804, and a new investigation element 806. For example, the investigation listing area 802 may include the investigations that a user has persisted. One or more the investigations may originally have been created by another and/or shared with the user. For example, as illustrated in FIG. 5N, a user may share investigation with another user, and if the other user persists investigation, then the investigation would appear within their investigation listing area 802. The investigation controls 804 may provide the capability for a user to delete or favorite an investigation. User selection of the new investigation element 806 may cause presentation of another user interface. For example, the new investigation user interface may correspond to the user interface 500 of FIG. 5A.

FIG. 8B illustrates an example home user interface of the query system 100. The example user interface 850 may include similar features and user interface options to the user interface 800 of FIG. 8A. However, the user interface 850 may include a shared investigation listing area 852 and share investigation controls 854. For example, the shared investigation controls 854 may indicate the particular access controls that a user may have for their shared investigations such as read only permissions or permissions to edit a shared investigation. Further detail regarding access controls is described herein with reference to FIG. 4.

Implementation Mechanisms

The various computing device(s) discussed herein, such as the query system 100, the data importer 104, the user interface server 106, the query generator 108, the user interface system 120, and/or user computing device 102, are generally controlled and coordinated by operating system software, such as, but not limited to, iOS, Android, Chrome OS, Windows XP, Windows Vista, Windows 7, Windows 8, Windows Server, Windows CE, Unix, Linux, SunOS, Solaris, Macintosh OS X, VxWorks, or other compatible operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things. The query system 100 may be hosted and/or executed on one or more computing devices with one or more hardware processors and with any of the previously mentioned operating system software.

Figure 9:
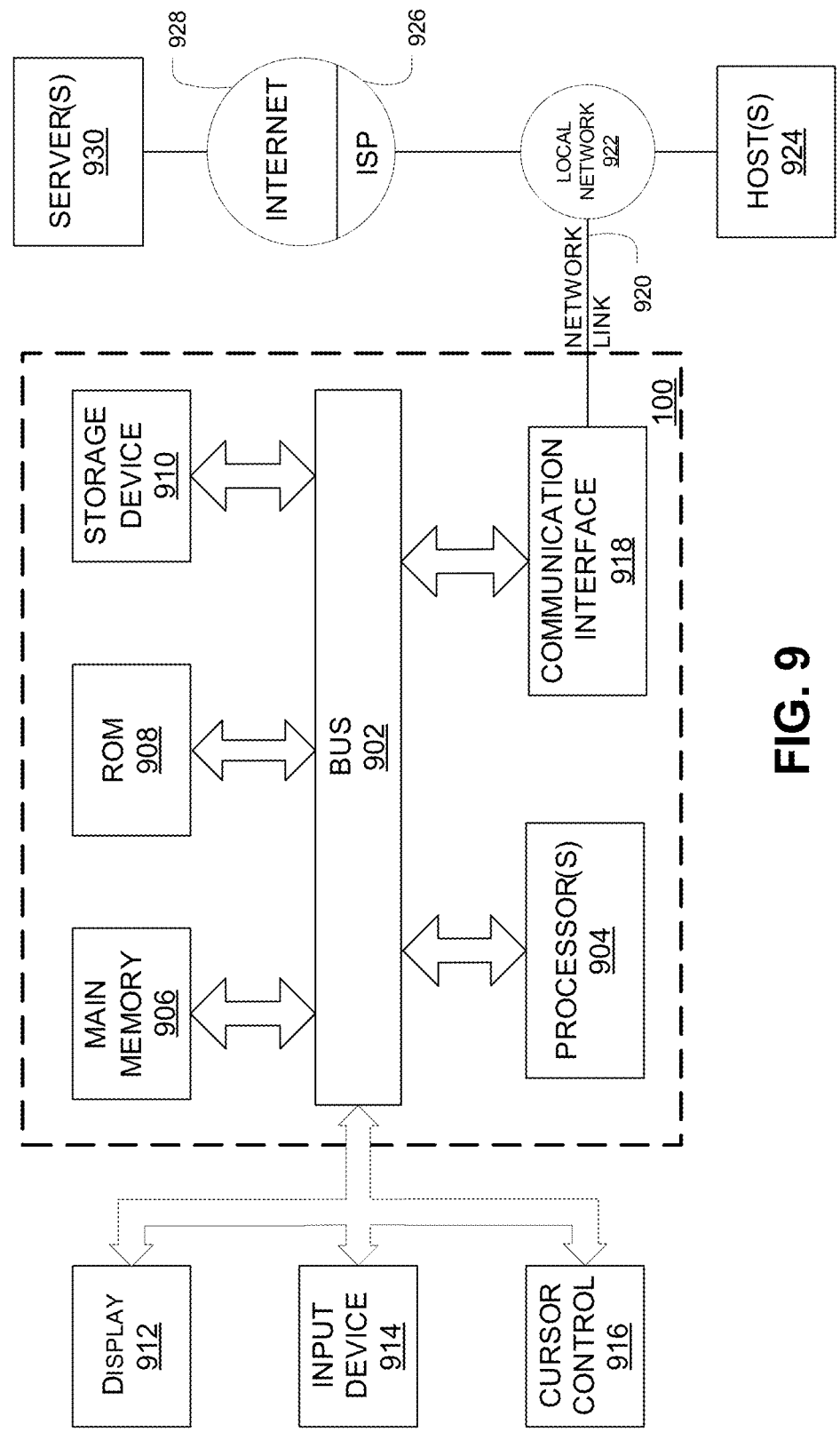
FIG. 9 is a block diagram illustrating an example query system with which various methods and systems discussed herein may be implemented.

FIG. 9 is a block diagram that illustrates example components of the query system 100. While FIG. 9 refers to the query system 100, any of the other computing devices, modules, services, and/or user computing devices discussed herein may have some or all of the same or similar components, such as the user interface system 120.

The query system 100 may execute software, e.g., stand-alone software applications, applications within browsers, network applications, etc., whether by the particular application, the operating system, or otherwise. Any of the systems discussed herein may be performed by the query system 100 and/or a similar computing system having some or all of the components discussed with reference to FIG. 9.

The query system 100 includes a bus 902 or other communication mechanism for communicating information, and a hardware processor, or multiple processors, 904 coupled with bus 902 for processing information.

The query system 100 also includes a main memory 906, such as a random access memory (RAM), cache and/or other dynamic storage devices, coupled to bus 902 for storing information and instructions to be executed by processor(s) 904. Main memory 906 also may be used for storing temporary variables or other intermediate information during execution of instructions to be executed by processor(s) 904. Such instructions, when stored in storage media accessible to processor(s) 904, render the query system 100 into a special-purpose machine that is customized to perform the operations specified in the instructions. Such instructions, as executed by hardware processors, may implement the methods and systems described herein for generating user interfaces, querying data, and/or presenting visualization data.

The query system 100 further includes a read only memory (ROM) 908 or other static storage device coupled to bus 902 for storing static information and instructions for processor(s) 904. A storage device 910, such as a magnetic disk, optical disk, or USB thumb drive (Flash drive), etc., is provided and coupled to bus 902 for storing information and instructions. The data importer 104 and/or the query generator 108 of FIG. 1 may be stored on the main memory 906 and/or the storage device 910.

The query system 100 and/or user computing device 102 may be coupled via bus 902 to a display 912, such as a cathode ray tube (CRT) or LCD display or touch screen, for displaying information to a computer user. An input device 914 is coupled to bus 1002 for communicating information and command selections to processor 904. One type of input device 914 is a keyboard including alphanumeric and other keys. Another type of input device 914 is a touch screen. Another type of user input device is cursor control 916, such as a mouse, a trackball, a touch screen, or cursor direction keys for communicating direction information and command selections to processor 904 and for controlling cursor movement on display 912. This input device may have two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The query system 100 may include a presentation server to implement a GUI, for example, FIGS. 5A-5N, 6A-6E, 7, and 8A-8B, which may be stored in a mass storage device as executable software codes that are executed by the computing device(s). This and other units may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "instructions," as used herein, refers to logic embodied in hardware or firmware, or to a collection of software units, possibly having entry and exit points, written in a programming language, such as, but not limited to, Java, Lua, C, C++, or C#. A software unit may be compiled and linked into an executable program, installed in a dynamic link library, or may be written in an interpreted programming language such as, but not limited to, BASIC, Perl, or Python. It will be appreciated that software units may be callable from other units or from themselves, and/or may be invoked in response to detected events or interrupts. Software units configured for execution on computing devices by their hardware processor(s) may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. Generally, the instructions described herein refer to logical modules that may be combined with other modules or divided into sub-modules despite their physical organization or storage.

The query system 100, or components of it, such as the data importer 104, the query generator 108, the user interface server 106 of FIG. 1, may be programmed, via executable code instructions, in a programming language.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 910. Volatile media includes dynamic memory, such as main memory 906. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor(s) 904 for execution. For example, the instructions may initially be carried on a magnetic disk or solid state drive of a remote computer. The remote computer may load the instructions into its dynamic memory and send the instructions over a telephone or cable line using a modem. A modem local to the query system 100 may receive the data on the telephone or cable line and use an infra-red transmitter to convert the data to an infra-red signal. An infra-red detector can receive the data carried in the infra-red signal and appropriate circuitry can place the data on bus 902. Bus 902 carries the data to main memory 906, from which the processor(s) 904 retrieves and executes the instructions. The instructions received by main memory 906 may retrieve and execute the instructions. The instructions received by main memory 906 may optionally be stored on storage device 910 either before or after execution by computer hardware processor(s) 904.

The query system 100 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN (or WAN component to be communicated with a WAN). Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from the query system 100, are example forms of transmission media.

A network, such as the network 160 of FIG. 1, may comprise, but is not limited to, one or more local area networks, wide area network, wireless local area network, wireless wide area network, the Internet, or any combination thereof.

The query system 100 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor(s) 904 as it is received, and/or stored in storage device 910, or other non-volatile storage for later execution.

In some embodiments, the query system 100, the user interface system 120, and/or the user computing device 102 may operate in a distributed computing environment including several computer systems that are interconnected using one or more computer networks. The query system 100, the user interface system 120, and/or the user computing device 102 could also operate within a computing environment having a fewer or greater number of devices than are illustrated in FIG. 1 and/or FIG. 9. Thus, the depiction of query system 100, the user interface system 120, and/or the user computing device 102 in FIG. 1 and/or FIG. 9 should be taken as illustrative and not limiting to the present disclosure. For example, the query system 100, the user interface system 120, and/or the user computing device 102 could implement various Web services components and/or peer-to-peer network configurations to implement at least a portion of the processes described herein. For example, multiple servers and/or processes may process and/or analyze items and/or present a user interface in a distributed manner, as described herein.

It will be appreciated that while the present disclosure typically discusses querying data related to food products, the systems and methods described herein may be agnostic to the types of data being queried and/or may query data unrelated to food products, such as, electronic product databases, automobile databases, or any database of items. In some embodiments, the systems and methods described herein enable the transformation of intuitive user interface selections into dynamic queries, such that a user may search and/or analyze large integrated data sets.

It will also be appreciated that while the present disclosure typically discusses active querying of data through investigations, the systems and methods described herein may be used for a dashboard and/or panel-centric user interface. For example, particular users may have predefined sets of panels that they are interested in reviewing periodically, which may be achieved by the systems and methods described herein.

Each of the processes, methods, and algorithms described in the preceding sections may be embodied in, and fully or partially automated by, code instructions executed by one or more computer systems or computer processors comprising computer hardware. The processes and algorithms may be implemented partially or wholly in application-specific circuitry.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

Any process descriptions, elements, or blocks in the flow diagrams described herein and/or depicted in the attached figures should be understood as potentially representing units, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A computer-implemented method for a graphical user interface to query an item database, the computer-implemented method comprising:
   by a computing system comprising one or more computer hardware processors and one or more storage devices,
   receiving, from a user interface, a first input comprising data indicative of item-related information and a compare-by-groupings selection, wherein the compare-by-groupings selection indicates a property type for grouping items, which is used by the computing system to identify a subset of groupings;
   receiving, from the user interface, a statistical measure input comprising data indicative of statistical-related information;
   identifying an item data source based at least on the first input, wherein the item data source comprises a plurality of items, wherein each item comprises a plurality of properties;
   identifying a statistical data source based at least on the statistical measure input;
   constructing a first query of the item data source and the statistical data source based at least on the first input and the statistical measure input;
   executing the first query of the item data source and the statistical data source to retrieve first results comprising a plurality of groupings, wherein each grouping corresponds to a distinct property value of the property type;
   in response to receiving the first input comprising the compare-by-groupings selection, identifying the subset of groupings from the plurality of groupings, wherein identifying the subset of groupings further comprises:
      determining, from the first results, a statistical measure for each grouping of the plurality of groupings, wherein the statistical measure comprises an aggregated value associated with two or more items; and
      determining, from the plurality of groupings, the subset of groupings according to a ranking of the statistical measure for each grouping of the plurality of groupings within a predetermined number of groupings;
   executing a second query of at least the statistical data source to retrieve second results for the subset of groupings, wherein the second results are grouped by the subset of groupings;
   presenting the second results in a first panel in the user interface, wherein presentation of the second results comprises a representation for each grouping of the subset of groupings, wherein presentation of the first panel comprises one or more first user-selected representations corresponding to the first input and the statistical measure input;
   receiving, from the user interface, a second input different from the first input;
   determining third results based at least on the second input, the first input, and the statistical measure input; and
   presenting:
      the third results in a second panel in the user interface, wherein presentation of the second panel comprises the one or more first user-selected representations and one or more second user-selected representations corresponding to the second input, and
      at least some of the first panel in the user interface.

2. The computer-implemented method of claim 1, further comprising:
   receiving, from the user interface, a third input comprising data indicative of entity-related information;
   identifying an entity data source based at least on the third input;
   constructing a third query of the item data source, the entity data source, and the statistical data source based at least on the first item input, the third input, and the statistical measure input;
   executing the third query to retrieve fourth results; and
   presenting the fourth results in the second panel in the user interface.

3. The computer-implemented method of claim 2, wherein item-related information comprises food attribute data, wherein statistical-related information comprises at least one of sales data, inventory data, days of supply, movement data, or forecast data, wherein the statistical measure input comprises a selection of a statistical measure for the statistical-related information, and wherein entity-related information comprises at least one of distributor data, distribution center data, or location establishment data.

4. A non-transitory computer storage medium storing computer executable instructions that when executed by a computer hardware processor perform operations comprising:

receiving, from a user interface, a first input comprising data indicative of entity-related information and a compare-by-groupings selection, wherein the compare-by-groupings selection indicates a property type for grouping entities, which is used by the computer hardware processor to identify a subset of groupings;

receiving, from the user interface, a statistical measure input comprising data indicative of statistical-related information;

identifying an entity data source based at least on the first input, wherein the entity data source comprises a plurality of entities, wherein each entity comprises a plurality of properties;

identifying a statistical data source based at least on the statistical measure input;

constructing a first query of the entity data source and the statistical data source based at least on the first input and the statistical measure input;

executing the first query of the entity data source and the statistical data source to retrieve first results comprising a plurality of groupings, wherein each grouping corresponds to a distinct property value of the property type;

in response to receiving the first input comprising the compare-by-groupings selection, identifying the subset of groupings from the plurality of groupings, wherein identifying the subset of groupings further comprises:

determining, from the first results, a statistical measure for each grouping of the plurality of groupings, wherein the statistical measure comprises an aggregated value associated with two or more items; and determining, from the plurality of groupings, the subset of groupings according to a ranking of the statistical measure for each grouping of the plurality of groupings within a predetermined number of groupings;

executing a second query of at least the statistical data source to retrieve second results for the subset of groupings, wherein the second results are grouped by the subset of groupings;

presenting the second results in a first panel in the user interface, wherein presentation of the second results comprises a representation for each grouping of the subset of groupings, wherein presentation of the first panel comprises one or more first user-selected representations corresponding to the first input and the statistical measure input;

receiving, from the user interface, a second input different from the first input;

determining third results based at least on the second input, the first input, and the statistical measure input; and presenting:
the third results in a second panel in the user interface, wherein presentation of the second panel comprises the one or more first user-selected representations and one or more second user-selected representations corresponding to the second input, and
at least some of the first panel in the user interface.

5. The non-transitory computer storage medium of claim 4, wherein the operations further comprise:

receiving, from the user interface, a third input comprising data indicative of item-related information;

identifying an item data source based at least on the third input;

constructing a third query of the item data source, the entity data source, and the statistical data source based at least on the first item input, the third input, and the statistical measure input;

executing the third query to retrieve fourth results; and presenting the fourth results in the second panel in the user interface.

6. The non-transitory computer storage medium of claim 4, wherein the first results comprise time series data, and wherein presenting the first results comprises presenting a graph of at least some of the time series data.

7. The non-transitory computer storage medium of claim 4, wherein the operations further comprise:

sending first data to a recipient, wherein the first data is associated with the first input and the statistical measure input.

8. A computing system comprising:
one or more hardware computer processors programmed, via executable code instructions, to:

receive, from a user interface, a first input comprising data indicative of item-related information and a compare-by-groupings selection, wherein the compare-by-groupings selection indicates a property type for grouping items, which is used by the computing system to identify a subset of groupings;

receive, from the user interface, a statistical measure input comprising data indicative of statistical-related information;

identify an item data source based at least on the first input, wherein the item data source comprises a plurality of items, wherein each item comprises a plurality of properties;

identify a statistical data source based at least on the statistical measure input;

construct a first query of the item data source and the statistical data source based at least on the first input and the statistical measure input;

execute the first query of the item data source and the statistical data source to retrieve first results comprising a plurality of groupings, wherein each grouping corresponds to a distinct property value of the property type;

in response to receiving the first input comprising the compare-by-groupings selection, identify the subset of groupings from the plurality of groupings, wherein identifying the subset of groupings further comprises:

determining, from the first results, a statistical measure for each grouping of the plurality of groupings, wherein the statistical measure comprises an aggregated value associated with two or more items; and determining, from the plurality of groupings, the subset of groupings according to a ranking of the statistical measure for each grouping of the plurality of groupings within a predetermined number of groupings;

execute a second query of at least the statistical data source to retrieve second results for the subset of groupings, wherein the second results are grouped by the subset of groupings;

present the second results in a first panel in the user interface, wherein presentation of the second results comprises a representation for each grouping of the subset of groupings, wherein presentation of the first panel comprises one or more first user-selected representations corresponding to the first input and the statistical measure input;

receive, from the user interface, a second input different from the first input;

determine third results based at least on the second input, the first input, and the statistical measure input; and present:

the third results in a second panel in the user interface, wherein presentation of the second panel comprises the one or more first user-selected representations and one or more second user-selected representations corresponding to the second input, and at least some of the first panel in the user interface.

9. The computing system of claim 8, wherein the one or more hardware processors are further programmed, via the executable instructions, to:

receive, from the user interface, a third input comprising data indicative of entity-related information;

identify an entity data source based at least on the third input;

execute a third query of at least the item data source and the statistical data source to retrieve fourth results, wherein the third query is based at least on the third input; and present the fourth results in the second panel in the user interface.

10. The computing system of claim 8, wherein the second results comprise time series data, and wherein the representation for each grouping of the subset of groupings comprises a graph.

11. The computing system of claim 8, wherein the one or more hardware processors are further programmed, via the executable instructions, to:

determine a second set of groupings from the plurality of groupings, wherein a grouping from the subset of groupings is not present in the second set of groupings; and wherein the second set of groupings correspond to a remaining number of groupings of the plurality of groupings above the predetermined number of groupings;

generate aggregated data corresponding to the second set of groupings; and present the aggregated data in the first panel in the user interface.

12. The computing system of claim 8, wherein the one or more hardware processors are further programmed, via the executable instructions, to:

receive, from the user interface, a third input comprising data indicative of a time period, wherein constructing the first query is further based at least on the third input, and wherein the first results comprises data corresponding to the time period.

13. The computing system of claim 8, wherein the one or more hardware processors are further programmed, via the executable instructions, to:

store the first user input as an investigation, wherein the investigation is associated with an access control list that specify permissions for one or more users to access the investigation.

* * * * *